(12) United States Patent
Yamamoto et al.

(10) Patent No.: US 9,780,413 B2
(45) Date of Patent: Oct. 3, 2017

(54) BATTERY COOLING SYSTEM

(71) Applicant: DENSO CORPORATION, Kariya, Aichi-pref. (JP)

(72) Inventors: Hiroyoshi Yamamoto, Nagoya (JP); Yoshimitsu Inoue, Chiryu (JP)

(73) Assignee: DENSO CORPORATION, Kariya (JP)

( * ) Notice: Subject to any disclaimer, the term of this patent is extended or adjusted under 35 U.S.C. 154(b) by 247 days.

(21) Appl. No.: 14/447,142

(22) Filed: Jul. 30, 2014

(65) Prior Publication Data
US 2015/0037632 A1    Feb. 5, 2015

(30) Foreign Application Priority Data

Aug. 1, 2013   (JP) ................................. 2013-160706
Aug. 19, 2013  (JP) ................................. 2013-169695
Apr. 7, 2014   (JP) ................................. 2014-078847

(51) Int. Cl.
| | |
|---|---|
| *H01M 2/10* | (2006.01) |
| *H01M 10/6563* | (2014.01) |
| *H01M 10/6565* | (2014.01) |
| *H01M 10/42* | (2006.01) |
| *H01M 10/625* | (2014.01) |
| *H01M 10/613* | (2014.01) |

(52) U.S. Cl.
CPC ..... *H01M 10/4207* (2013.01); *H01M 2/1077* (2013.01); *H01M 10/613* (2015.04); *H01M 10/625* (2015.04); *H01M 10/6563* (2015.04); *H01M 10/6565* (2015.04); *H01M 2220/20* (2013.01)

(58) Field of Classification Search
None
See application file for complete search history.

(56) References Cited

U.S. PATENT DOCUMENTS

| | | | |
|---|---|---|---|
| 2006/0090492 A1 | 5/2006 | Ahn et al. | |
| 2010/0236854 A1* | 9/2010 | Nakamura | B60K 1/04 180/68.5 |
| 2015/0291019 A1* | 10/2015 | Hatta | B60K 11/06 180/68.2 |

FOREIGN PATENT DOCUMENTS

| | | |
|---|---|---|
| JP | 2002-042753 | 2/2002 |
| JP | 2004-006089 | 1/2004 |

(Continued)

OTHER PUBLICATIONS

Machine translation of JP 2011-116321, Jun. 2011.*

(Continued)

*Primary Examiner* — Jonathan Crepeau
(74) *Attorney, Agent, or Firm* — Nixon & Vanderhye P.C.

(57) ABSTRACT

A battery cooling system has a case that forms an internal space surrounded by a plurality of walls to accommodate a plurality of battery cells, a blower accommodated in the case that circulates a fluid for cooling the plurality of battery cells inside of the case, and a passage-along-wall forming member. The passage-along-wall forming member forms passage-along-walls along with and between side walls among the plurality of walls that forms the case. The passage-along-wall forming member has an inflow part where the fluid flowing out of the blower before contacting the battery cells passes when flowing into the passage-along-wall, and an outflow part where the fluid flowed in from the inflow part into the passage-along-wall passes when flowing out from the passage-along-wall.

10 Claims, 12 Drawing Sheets

(56) References Cited

FOREIGN PATENT DOCUMENTS

| | | | |
|---|---|---|---|
| JP | 2008-050929 | | 3/2008 |
| JP | 2008-513949 | | 5/2008 |
| JP | 2009-211829 | | 9/2009 |
| JP | 2010-015955 | | 1/2010 |
| JP | 2011-116321 | | 6/2011 |
| JP | 2011-134615 | * | 7/2011 |
| JP | 2011-258426 | | 12/2011 |
| JP | 2013-086605 | | 5/2013 |
| JP | 2015-046321 | | 3/2015 |

OTHER PUBLICATIONS

Office Action (3 pages) dated Jul. 21, 2015 issued in corresponding Japanese Application No. 2014-078847 and English translation (4 pages).

Office Action (3 pages) dated Jun. 9, 2015 issued in corresponding Japanese Application No. 2013-160706 and English translation (4 pages).

* cited by examiner

BATTERY COOLING SYSTEM

CROSS-REFERENCE TO RELATED APPLICATION

This application is based on and claims the benefit of priority from earlier Japanese Patent Applications no. 2013-160706 filed Aug. 1, 2013, No. 2013-169695 filed Aug. 19, 2013, and No. 2014-78847 filed Apr. 7, 2014 the descriptions of which are incorporated herein by reference.

TECHNICAL FIELD

The present disclosure relates to a battery cooling system that cools batteries accommodated inside a case.

BACKGROUND

A system disclosed in Japanese Patent Application Laid-Open Publication No. 2013-86605 is to connect an intake duct and an exhaust duct to a pack case where a plurality of battery cells are accommodated, take air supplied from a cooling fan into inside the case through the intake duct, and discharge air after heat-exchanging with the battery cells through the exhaust duct to outside.

That is, air discharged outside after heat-exchanging will not return to the inside of the case immediately, and new air for cooling the batteries is always be taken into the inside of the case.

Air supplied from the cooling fan flows towards the battery cell after passing through the inside of the intake duct in the system of the Publication No. '605.

Then, air after passing the battery cells is immediately discharged to outside passing through the inside of the exhaust duct.

That is, there is only a small amount of air that contacts case walls that function as heat releasing surfaces to outside in the process of sucking air, passing the battery cell, and discharging air in the Publication No. '605, thus the heat released to outside is insufficient.

Thus, regarding a point of releasing generated heat by the battery effectively to outside the case, sufficient effect is not obtained in the conventional system, and there is room for improvement.

SUMMARY

An embodiment provides a battery cooling system that can release heat outside of a case efficiently.

Moreover, the battery cooling system is required to secure both heat releasing performance and rigidity of the case. Especially this requirement is a performance needed in the battery cooling system installed in vehicles.

Therefore, the present disclosure has as its another object to provide a battery cooling system that can achieve both efficient heat releasing to outside a case and improving a case rigidity.

In a battery cooling system according to a first aspect, the battery cooling system includes a plurality of batteries mutually electrically connected, a case includes a plurality of walls surrounding an internal space which accommodates the plurality of batteries, a fluid driving unit accommodated in the case that circulates a fluid for cooling the plurality of batteries inside of the case, and a wall passage forming member that forms a wall passage disposed along and between at least a single wall among the plurality of walls that forms the case.

The wall passage forming member has an inflow part and an outflow part. The inflow part is a part where the fluid from the fluid driving unit passes before contacting the batteries when flowing into the wall passage. The outflow part is a part where the fluid from the inflow part taken into the wall passage passes when flowing out from the wall passage.

According to the present disclosure, a flow that circulates through the wall passage and contacts the walls of the case can be formed by the wall passage forming member before the fluid that flows out of the fluid driving unit contact the batteries, while the flow can be directed to the batteries or other walls by flowing out the fluid in the wall passage from the outflow part.

Thus, it is possible to spread the cooling fluid to a large area of the walls that form the case in a process of the fluid circulating through the inside of the case.

Thereby, the fluid flow sent from the fluid driving unit can accelerate the heat releasing through the walls of the case before the fluid reaches the battery, and fluid flow that contacts widely to the plurality of batteries can be offered.

Therefore, according to the present disclosure, the battery cooling system that can achieve efficient heat releasing to outside the case compared with conventional technology can be offered.

In the battery cooling system according to a second aspect, the outflow part includes an outflow part for communication that faces an adjoining wall so that the fluid flowing through the wall passage flows out from the wall passage and further flows along the adjoining wall.

In the battery cooling system according to a third aspect, the wall passage forming member has a plurality of outflow parts, the plurality of outflow parts is disposed along a flowing direction of the fluid that flows through the wall passage with intervals therebetween, and the fluid that flows out from the outflow parts flows towards the batteries.

In the battery cooling system according to a fourth aspect, the wall passage forming member includes an inner wall disposed away from at least the single wall with an interval therebetween so as to face the single wall of the case.

In the battery cooling system according to a fifth aspect, the outflow part is an opening formed in the inner wall.

In the battery cooling system according to a sixth aspect, the wall passage forming member is formed integrally with at least a single wall, and is constituted by a duct-shaped member with both ends having openings that constitute the inflow part and the outflow part respectively.

In the battery cooling system according to a seventh aspect, the duct-shaped member is formed integrally with a top wall that is one of the walls to form the case so that upper parts of the plurality of batteries are covered.

In the battery cooling system according to an eighth aspect, the duct-shaped member is formed integrally with a side wall that is one of the walls to form the case so that sides of the plurality of batteries are covered.

In the battery cooling system according to a ninth aspect, the wall passage includes passages disposed along the walls of the case that face each other with the plurality of batteries disposed therebetween.

In the battery cooling system according to a tenth aspect, there are further provided passages disposed along the wall that adjoins both the walls of the case that face each other with the plurality of batteries disposed therebetween.

In the battery cooling system according to an eleventh aspect, a fluid flow guiding unit is disposed in the passage that guides the fluid that flows out from the fluid driving unit and before contacting the batteries in the direction away from the batteries, and the fluid flow guiding unit is projecting from the walls of the case, and is constituted by a projected portion extending in a direction away from the batteries.

DETAILED DESCRIPTION OF THE PREFERABLE EMBODIMENTS

Figure 1:
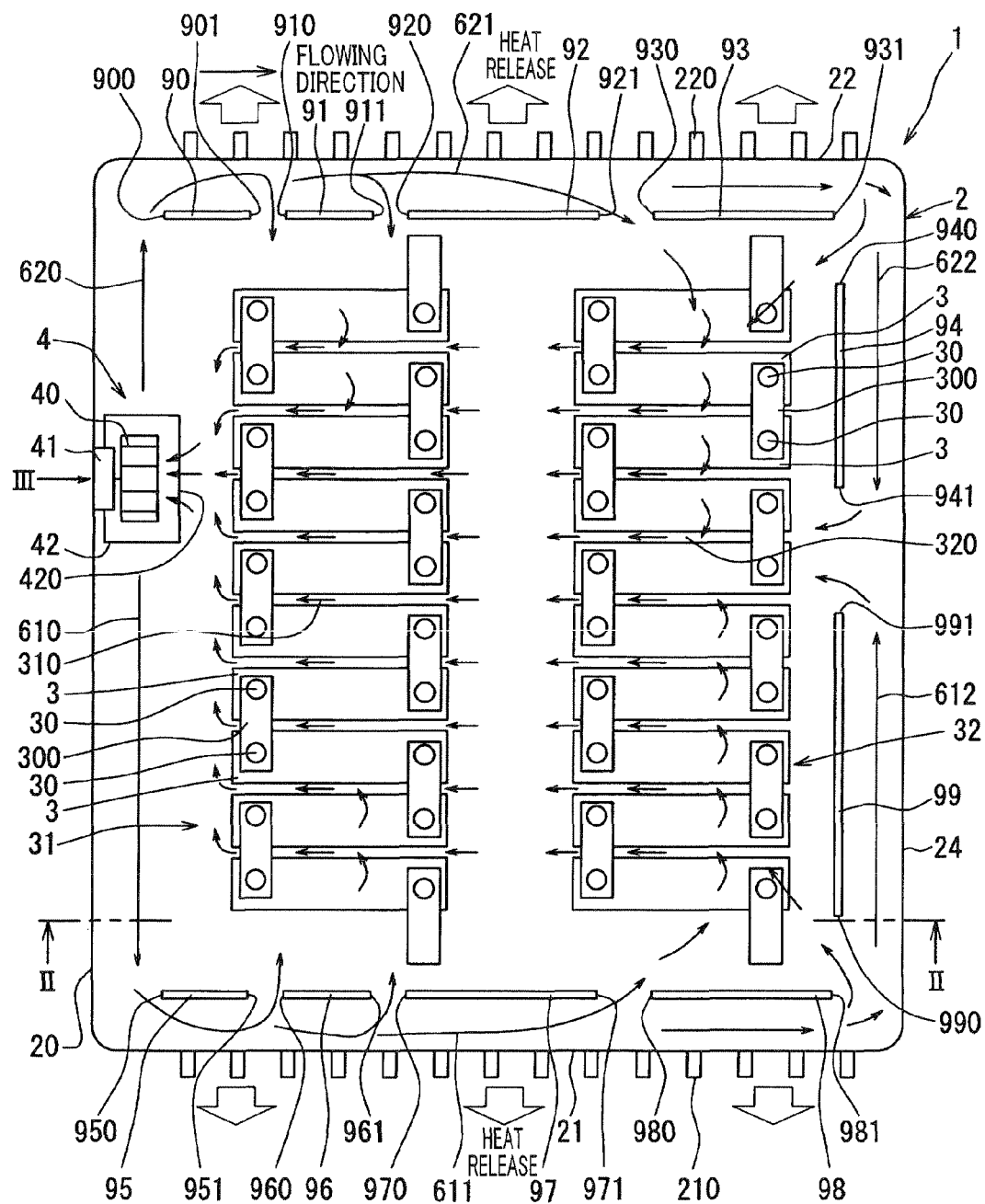
FIG. 1 shows a schematic diagram for explaining a composition of a system and a flow of fluid for cooling batteries of a battery cooling system in a first embodiment.

With reference to the drawings, hereinafter will be described a plurality of embodiments of the present disclosure.

It should be appreciated that, in the embodiments, components identical with or similar to those in the preceding embodiment are given the same reference numerals, and structures and features thereof will not be described in order to avoid redundant explanation.

When only a part of the structure is explained in each embodiment, other embodiments described previously may be applied for the rest of the structure.

Not only the combination of portions specified that the combination is concretely possible with each embodiment, but the embodiments may be partially combined even if not specified clearly as long as no particular problem arises about the combination.

[First Embodiment]

Figure 2:
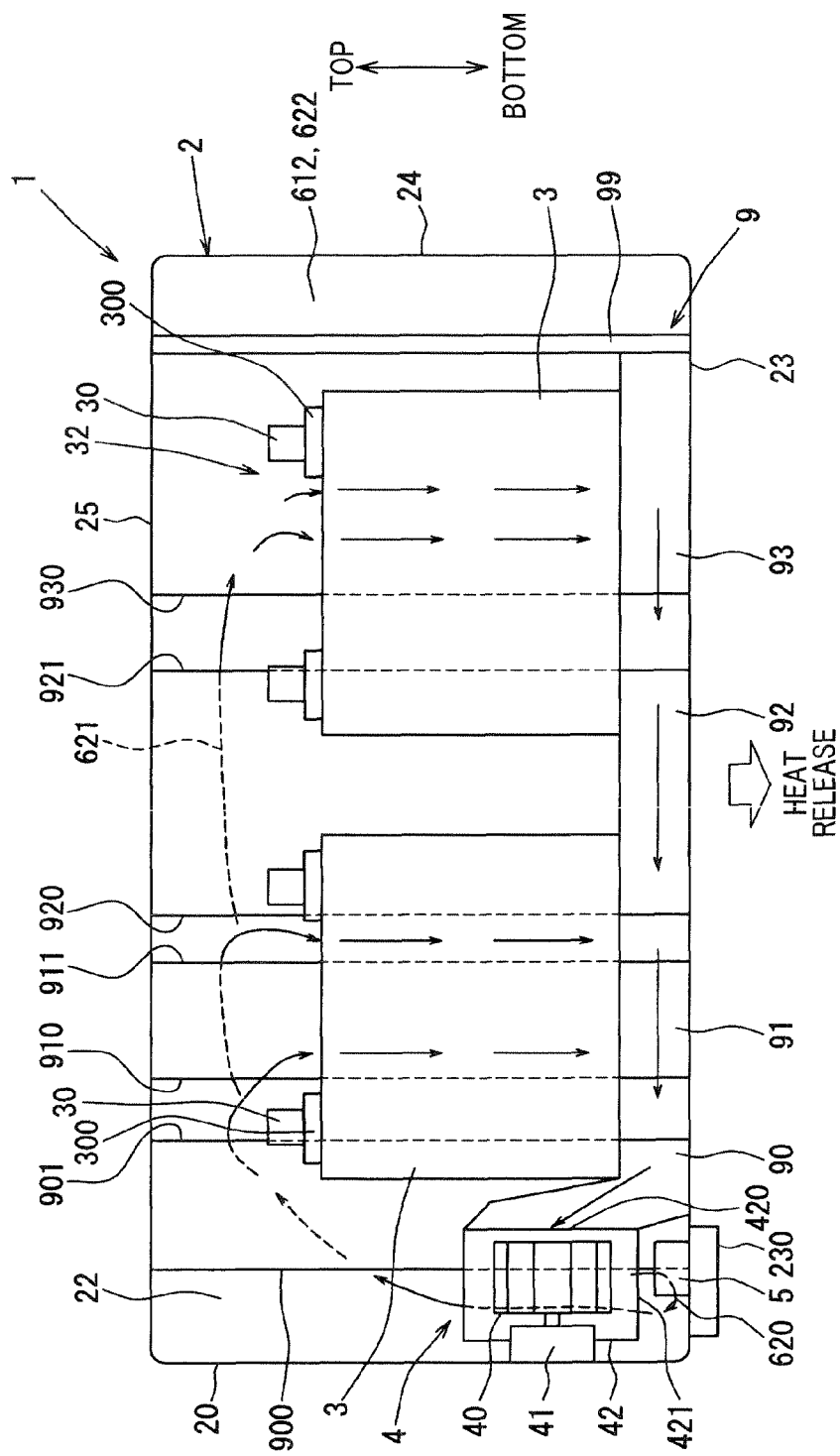
FIG. 2 shows a sectional view taken along a line II-II of FIG. 1.
Figure 3:
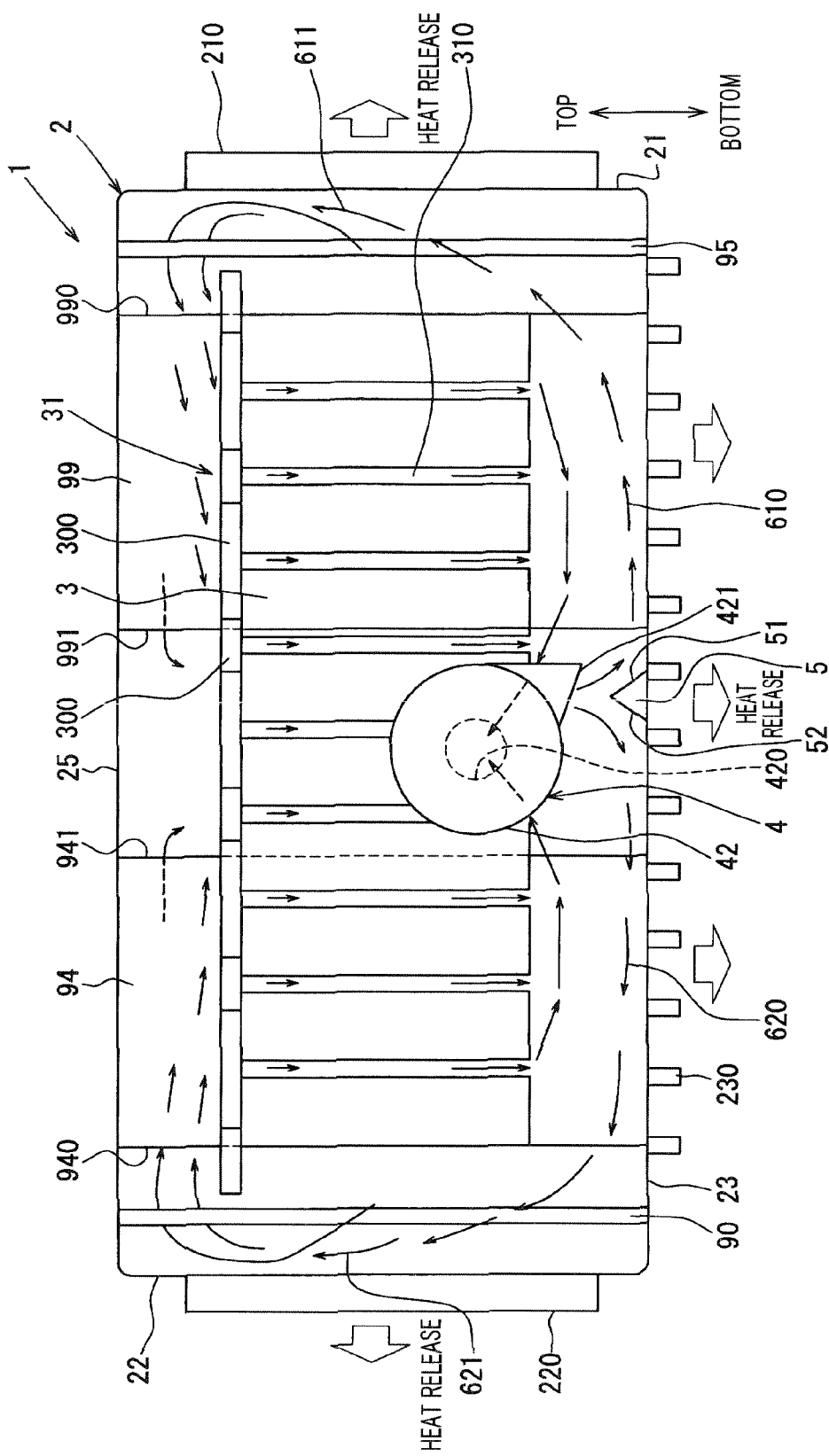
FIG. 3 shows a schematic diagram of an inside of a case when seen in a direction of an arrow III of FIG. 1.

With reference to FIG. 1-FIG. 3, hereinafter will be described a battery cooling system 1 of the first embodiment regarding the present disclosure.

FIG. 1-FIG. 3 are schematic diagrams showing a fluid flow for cooling batteries in the battery cooling system 1 and a composition inside a case 2.

The battery cooling system 1 is used for vehicles such as a hybrid car that uses an internal-combustion engine and a motor driven by an electric power charged in batteries as a driving source by combining them, or an electric vehicle that uses a motor as a driving source, for example.

A plurality of batteries included in the battery cooling system 1 may be nickel-hydrogen rechargeable batteries, lithium-ion rechargeable batteries, or organic radical batteries, for example.

The battery cooling system 1 has a plurality of battery cells 3, the case 2 that forms a sealed space, a fluid driving unit that circulates fluid within the case 2, and a wall passage forming member 9 (hereinafter, simplified to passage forming member 9).

The plurality of battery cells 3 and a blower 4, which is an example as a fluid driving unit, are accommodated inside the case 2.

The plurality of battery cells 3 constitutes a plurality of cell stacks 31, 32.

Each cell stack 31, 32 includes predetermined number of the battery cells 3 stacked with intervals therebetween, and a cell assembly is constituted by connecting adjoining electrode terminals 30 disposed at tops of the battery cells 3 electrically in series with bus bars 300. The bus bar 300 is a heat releasing member made of a conductive metal plate.

Stacking directions of the cells in the cell stack 31 and the cell stack 32 are the same, and the cell stacks 31, 32 are disposed inside the case 2 side by side with predetermined intervals therebetween in a direction perpendicular to the stacking directions of the cells, or in a horizontal direction. Thus, the case 2 accommodates at least one cell stack.

Each battery cell 3 is a single battery that forms an internal space sealed by an exterior case made of resin or metal where it has electrical insulation properties, for example, and has a shape of a flat rectangular parallelepiped.

Exterior case of the battery cell 3 is formed with various resins or metals that have insulation properties, for example.

For resin, resin such as polypropylene, polyethylene, polystyrene, vinyl chloride, fluorine-based resin, PBT (polybutylene terephthalate), polyamide, polyamide imide, ABS resin, or polyacetal can be used, for example.

Moreover, resin such as polycarbonate, polyethylene terephthalate, polyphenylene sulfide, phenol, epoxy, and acrylic can also be used.

In each battery cell 3, two electrode terminals 30 consisting of an anode terminal and a cathode terminal are projected from one surface of exterior case.

A projection direction of the electrode terminal 30 is a direction intersecting perpendicularly to a thickness direction or the stacking direction of the battery cell 3, and the projection direction is upward, for example.

The electrode terminal 30 is projected from an end surface that intersects perpendicularly with a main side surface of the flat rectangular parallelepiped.

This main side surface is a surface facing an adjoining battery cell and a inter-battery passages where a fluid for cooling flows is disposed between the main side surfaces of the adjoining battery cells 3.

Inter-battery passages 310 are formed between the adjoining battery cells 3 of the cell stack 31. Inter-battery passages 320 are formed between the adjoining battery cells 3 of the cell stack 32.

The plurality of battery cells 3 are controlled by electronic components (not shown) used for electric charge and discharge, or temperature control.

The electronic components mentioned above may be a DC-DC converter, a motor that drives a fluid driving unit, electronic parts controlled by an inverter, or various kinds of electronic controlling devices, etc., for example, and may be accommodated in the case 2.

Moreover, the electronic components can be cooled together with the battery cells 3 by circulation of fluid by being accommodated in the case 2.

Furthermore, a cell surveillance unit that monitors at least voltage and temperature of the battery cell 3, a junction box, a service plug, or the like may be accommodated in the case 2.

The circulating flow passage that forms a circulating course of the fluid that flows forcibly due to the blower 4 is formed in the case 2.

The circulating flow passage is a flow passage where the fluid circulates disposed in an internal space surrounded by the case 2.

The circulating flow passage that forms the circulating course of a series of the fluid that is sucked into the blower 4 after the fluid blown from the blower 4 heat-exchanges with the battery cells 3.

The circulating flow passage is composed of a series of passages that connects the blower 4 as the starting point, a first branching passage 610, a first wall passage 611 and another first wall passage 612, a second branching passage 620, a second wall passage 621 and another second wall passage 622, and each inter-battery passages 310, 320.

The fluid from the blower 4 is branched into the first branching passage 610 and the second branching passage 620. The branched fluids flow through the first wall passage 611, 612 and the second wall passage 621, 622, respectively. The branched fluids are then joined at the inter-battery passages 310, 320, and the joined fluid is sucked into a suction part 420 of the blower 4.

Thus, after flowing through the inter-battery passages 310, 320 through a plurality of branches from the blower 4 as the starting point, the fluid for cooling the batteries circulates in the internal space of the case 2 and collects at the blower 4 again.

The blower 4 is an example of the fluid driving unit that circulates the fluid for cooling the plurality of battery cells accommodated in the case 2 in the circulating flow passage formed in the case 2.

As a fluid for cooling the batteries, air, various kinds of gas, water, and other coolant can be used, for example.

Here, the blower 4 is designated to be a fluid driving unit to make air circulate through the circulating flow passage.

The blower 4 is composed of a motor 41, a sirocco fan 40 driven by the motor 41, and a casing 42 where the sirocco fan 40 is accommodated. Moreover, the casing 42 has the suction part 420 and a discharge part 421 that are parts of the circulating flow passage. The blower 4 is controlled by a controlling device.

Each battery cell 3 is self-heating when current is charged (input) and discharged (output).

A battery monitoring unit continuously monitors the temperature of the battery cell 3, and controls an operation of the blower 4 according to the temperature of the battery cell 3 monitored.

The suction part 420 constitutes an inlet of the casing 42, and is also a passage that extends in an axial direction of the sirocco fan 40 where air sucked by the sirocco fan 40 passes through.

The sirocco fan 40 is disposed at a lower part of the internal space of the case 2 and is disposed near a side wall 20 of the case 2.

The motor 41 is disposed between the side wall 20 and the sirocco fan 40. A rotating shaft of the sirocco fan 40 is disposed so as to be parallel to a bottom wall 23 and a top wall 25 of the case 2.

A passage constituted by the suction part 420 is a passage located in the battery cell 3 side of the cell stack 31, and is lead to each inter-battery passage 310.

Furthermore, the inter-battery passages 310, 320 of the cell stack 32 are connected to each other.

A direction of air flowing through each inter-battery passage 310, 320 is the same as that of air sucked into the suction part 420.

Therefore, air flowing through each inter-battery passages 310, 320 has small air-flow resistance, and is smoothly sucked by the blower 4 by sucking force of the blower 4.

Furthermore, the discharge part 421 is formed to the casing 42. The discharge part 421 constitutes a passage that extends in a centrifugal direction of the fan that intersects perpendicularly with the axial direction of the sirocco fan 40.

The discharge part 421 is a passage that extends in the direction that intersects perpendicularly with the suction part 420.

Therefore, the discharge part 421 is a part of a passage that extends downwardly in the internal space of the case 2.

The discharge part 421 opens at a position near to the bottom wall 23 from a central part of a height direction of the case 2, and is disposed so as to be positioned above a projecting portion 5 projected from the bottom wall 23.

The blower 4 blows air from the discharge part 421 towards the projecting portion 5.

The projecting portion 5 is a portion projected from the bottom wall 23 towards inside the case 2.

Moreover, the battery cooling system 1 has a multiple passage forming unit inside the case 2.

A multiple passage forming unit has a function of branching air sent from the blower 4 into a plurality of passages so that air contacts the battery cell 3 after contacting at least two walls.

The projecting portion 5 is an example of a multiple passage forming unit, and is a mountain-shaped projecting portion having predetermined projection height and length.

The projecting portion 5 has a shape of a gabled roof that has at least two slopes 5a, 5b that extend in mutually different directions.

The slope 5a and the slope 5b have an equivalent angle of gradient to a vertical direction or to the bottom wall 23.

The blower 4 blows air downwardly towards the projecting portion 5.

The air flowing toward the projecting portion 5 from the blower 4 flows along each of the slopes 5a, 5b when flowing from a top part of the projecting portion 5 to the bottom, and flows along a surface of the bottom wall 23.

Moreover, a partition wall that divides the first branching passage 610 and the second branching passage 620, and an upper space of the suction part 420 may be provided between the battery cells 3 and the side wall 20 in the case 2.

This partition wall functions so that the air flow branched into the first branching passage 610 and second branching passage 620 by the projecting portion 5 does not flow down to the battery cell 3 side.

The passage forming member 9 forms a wall passage that flows along the wall of the case 2 between at least a single wall among the plurality of walls that forms the case 2.

The passage forming member 9 forms the first wall passage 611, the other first wall passage 612, the second wall passage 621, and the other second wall passage 622.

Hereinafter, each of these wall passages may be simply called the wall passage.

In the battery cooling system 1, the passage forming member 9 is constituted by inner walls 90, 91, 92, 93, 94, 95, 96, 97, 98, and 99.

The first wall passage 611 is a passage formed between the side wall 22 and the inner walls 95, 96, 97, and 98 that are disposed in a line in the direction parallel to the side wall 21 so as to flow along the side wall 21.

The other first wall passage 612 is a passage formed between the side wall 24 and the inner wall 99 that is disposed in the direction parallel to the side wall 24 so as to flow along the side wall 24.

The inner walls 95, 96, 97, and 98 are disposed away from the side wall 21 with an interval therebetween so as to face the side wall 21 that is the single wall of the case 2.

The inner wall 99 is disposed away from the side wall 24 so as to face the side wall 24 that is the other single wall of the case 2.

The second wall passage 621 is a passage formed between the side wall 22 and the inner walls 90, 91, 92 and 93 that are disposed in a line in the direction parallel to the side wall 22 so as to flow along the side wall 22.

The second wall passage 622 is a passage formed between the side wall 24 and the inner wall 94 that is disposed in the direction parallel to the side wall 24 so as to flow along the side wall 24.

The inner walls 90, 91, 92, and 93 are disposed away from the side wall 22 so as to face the side wall 22 that is the other single wall of the case 2.

The inner wall 94 is disposed away from the side wall 24 so as to face the side wall 24 that is the other single wall of the case 2.

The passage forming member 9 has an inflow part and an outflow part. The inflow part is a part where the fluid flowing out of the blower 4 before contacting the battery cells 3 passes when flowing into the wall passage. The outflow part is a part where the fluid flowed in from the inflow part into the wall passage passes when flowing out from the wall passage. There is provided at least one each of the inflow part and outflow part.

The passage forming member 9 has two inflow parts and a plurality of outflow parts as shown in the drawings as an example.

The inflow part in the first wall passage 611 is an inlet passage formed between an upstream side end 950 of the inner wall 95 and the side wall 21, and connects the first branching passage 610 and the first wall passage 611.

The other inflow part in the second wall passage 621 is an inlet passage formed between an upstream side end 900 of the inner wall 90 and the side wall 22, and communicates the second branching passage 620 and the second wall passage 621.

As shown in FIG. 2 and FIG. 3, each inflow part has an opening length in the vertical direction equivalent to the length in the vertical direction of the sealed space.

Moreover, each inflow part is an opening having a slit-shape that is vertically thin and long.

The plurality of outflow parts is disposed so that intervals are provided between them in a flowing direction of the fluid that flows through the wall passage.

The fluid flowing out of these outflow parts is configured to flow towards the battery cells 3.

The outflow parts are openings formed in the inner walls disposed in a line parallel to the side wall so as to flow along the side wall.

The outflow part in the first wall passage 611 positioned in the most upstream is a passage formed between a downstream side end 951 of the inner wall 95 and an upstream side end 960 of the inner wall 96.

The outflow part positioned next in the upstream is a passage formed between a downstream side end 961 of the inner wall 96 and an upstream side end 970 of the inner wall 97.

Furthermore, the outflow part positioned next in the upstream is a passage formed between a downstream side end 971 of the inner wall 97 and an upstream side end 980 of the inner wall 98.

The outflow part positioned in the most downstream is a passage formed between a downstream side end 981 of the inner wall 98 and an upstream side end 990 of the inner wall 99.

The outflow part in the second wall passage 621 positioned in the most upstream is a passage formed between a downstream side end 901 of the inner wall 90 and an upstream side end 910 of the inner wall 91.

The outflow part positioned next in the upstream is a passage formed between a downstream side end 911 of the inner wall 91 and an upstream side end 920 of the inner wall 92.

Furthermore, the outflow part positioned next in the upstream is a passage formed between a downstream side end 921 of the inner wall 92 and an upstream side end 930 of the inner wall 93.

The outflow part positioned in the most downstream is a passage formed between a downstream side end 931 of the inner wall 93 and an upstream side end 940 of the inner wall 94.

Furthermore, a passage formed between a downstream side end 991 of the inner wall 99 and a downstream side end 941 of the inner wall 94 is a rearmost outflow part in the passages-along-wall.

The fluid flowing out of each outflow part flows toward the battery cells 3.

As shown in FIG. 2 and FIG. 3, each outflow part has an opening length in the vertical direction equivalent to the length in the vertical direction of the sealed space.

Moreover, each outflow part is an opening having a slit-shape that is vertically thin and long.

Moreover, the outflow part of the passage forming member 9 includes an outflow part for communication that faces the side wall 24 so that the fluid circulating the first wall passage 611 may flow out the first wall passage 611 and may flow through along the adjoining side wall 24.

This outflow part for communication is an exit passage formed between the downstream side end 981 of the inner wall 98 and the side wall 21, and communicates the first wall passage 611 and the other first wall passage 612.

Moreover, the outflow part of the passage forming member 9 includes an outflow part for communication that faces the side wall 24 so that the fluid circulating the second wall passage 621 may flow out the second wall passage 621 and may flow through along the adjoining side wall 24.

This outflow part for communication is an exit passage formed between the downstream side end 931 of the inner wall 93 and the side wall 22, and communicates the second wall passage 621 and the other second wall passage 622.

As shown in FIG. 2 and FIG. 3, each outflow part for communication has an opening length in the vertical direction equivalent to the length in the vertical direction of the sealed space.

Moreover, each outflow part for communication is an opening having a slit-shape that is vertically thin and long.

Moreover, the first wall passage 611 and the second wall passage 621 are passages disposed along each of the walls (the side wall 21, the side wall 22) of the case 2 disposed facing each other with the plurality of battery cells 3 disposed therebetween.

Further, the first wall passage 612 and the second wall passage 622 are passages disposed along another surface of the wall (side wall 24) that adjoins both of the walls (the side wall 21, the side wall 22) of the case 2 disposed facing each other with the plurality of battery cells 3 disposed therebetween.

The case 2 has a shape of a rectangular parallelepiped, and is constituted that at least one of the walls is removable for maintenance, for example. The case 2 is made of a resin cast or metal plates.

Metal is an aluminum alloy, a zinc alloy, etc., for example.

Materials that can secure hardness and intensity as the case 2 and can secure heat releasing can be used for resin.

For example, polycarbonate, nylon, ultrahigh molecular weight polyethylene, shock-proof plastics such as cross-linked polyolefin, fiber-reinforced plastic including fiber glass, etc., carbon fiber resin, and the like are adoptable for resin.

The case 2 may be constituted of a box that has at least six sides (walls), for example.

When it is a rectangular parallelepiped case, the case 2 is formed by the bottom wall 23 and the top wall 25 that are facing each other, and the side wall 20, the side wall 21, the side wall 22 and the side wall 24 that intersect perpendicularly with the bottom wall 23 and the top wall 25.

The side wall 20 and the side wall 24 are facing each other, and the side wall 21 and the side wall 22 are facing each other.

The case 2 forms the sealed space surrounded by the plurality of walls.

Moreover, among the plurality of the walls of the case 2, convex portions or concave portions are formed on predetermined walls in order to enlarge heat releasing area.

The case 2 has first heat-release accelerating portions 230 on an outer surface of the bottom wall 23 that is exposed to outside and is a back side of an inner side of the bottom wall 23 where the projecting portion 5 is formed.

The first heat-release accelerating portions 230 are heat release accelerators that accelerate the external heat release more than other parts, and expand the surface area exposing outside.

The first heat-release accelerating portions 230 are heat releasers that release the heat of air flowing through the first branching passage 610 and second branching passage 620 to outside through the bottom wall 23 effectively.

The first heat-release accelerating portions 230 can be constituted of a plurality of tabular fins projected from the outer surface of the bottom wall 23, for example.

The heat of air flowing through the first branching passage 610 and second branching passage 620 is heat-transferred to the bottom wall 23, and absorbed by further heat-transferred to the first heat-release accelerating portions 230 from the bottom wall 23, then released to air outside that contacts with the first heat-release accelerating portions 230.

Air just blown from the blower 4 is heat-release accelerated by this heat course during circulating through the sealed space (or circulation passage).

Furthermore, the case 2 has second heat-release accelerating portions 210, 220 that expand the surface area exposing outside on each of outer surfaces of the side walls 21, 22 that adjoin the outer surface where the first heat-release accelerating portions 230 are disposed.

The second heat-release accelerating portions 210, 220 have the same function as the first heat-release accelerating portions 230.

The second heat-release accelerating portions 210 are heat releasers that release the heat of air flowing through the first wall passage 611 via the first branching passage 610 to outside through the side wall 21 effectively.

The second heat-release accelerating portions 220 are heat releasers that release the heat of air flowing through the first wall passage 621 via the first branching passage 620 to outside through the side wall 22 effectively.

The second heat-release accelerating portions 210, 220 can be constituted of a plurality of tabular fins projected from the outer surfaces of the side walls 21, 22, for example.

The heat of air flowing through the first wall passage 611 and the second wall passage 621 is heat-transferred to the side walls 21, 22, respectively, and absorbed by further heat-transferred to the second heat-release accelerating portions 210, 220 from the side walls 21, 22, then released to air outside that contacts with the heat-release accelerating portions 210, 220.

Air blown from the blower 4 is heat-release accelerated by this heat-releasing route of the second heat-release accelerating portions 210, 220 in addition to the first heat-release accelerating portions 230 during circulating through the sealed space (or circulation passage).

The fins that constitute a heat-release accelerating portions are members for expanding outer surface areas of the bottom wall 23, the side wall 21, and the side wall 22.

Moreover, each fin is constituted of a material with high thermal conductivity, and is formed with aluminum, copper, or alloy thereof, for example.

Moreover, attachment stays for fixing to a vehicle by bolts and an apparatus accommodation box may be provided to the case 2.

A battery monitoring unit to which detected results, such as voltage and temperature from various sensors, are inputted, a controlling device that controls electric power transfer of the DC-DC converter and operation of a fluid driving unit and communicable with the battery monitoring unit, and wire harness that connect each apparatus, and the like are accommodated in the apparatus accommodation box.

The battery monitoring unit is an electronic control unit of the battery that monitors the states (temperature, voltage, etc.) of each battery cell 3, and is connected with the battery cells 3 with multiple wirings.

The circulation passages within the case 2 constitute passages exposed to inner wall surfaces of the case 2 at the first branching passage 610, the first wall passage 611, the first wall passage 612, the second branching passage 620, the second wall passage 621, the second wall passage 622, and the inter-battery passages 310, 320.

That is, the circulation passages are communicated to the inner wall surfaces of the case 2 in almost all portions.

When the blower 4 is driven, air is blown towards the projecting portion 5 from the discharge part 421 of the blower 4.

Air that reaches the projecting portion 5 is divided into the first branching passage 610 and the second branching passage 620 by the projecting portion 5.

Air that flows through the first branching passage 610 flows toward the side wall 21 while contacting the bottom wall 23, and flows into the first wall passage 611 from between the upstream side end 950 of the inner wall 95 and the side wall 21.

On the other hand, air that flows through the second branching passage 620 flows toward the side wall 22 while contacting the bottom wall 23, and flows into the second wall passage 621 from between the upstream side end 900 of the inner wall 90 and the side wall 22.

Air that flows through the first wall passage 611 flows toward the side wall 24 while contacting the side wall 21.

A part of this air flows out from four outflow parts disposed between adjoining inner walls toward the central part of the sealed space, i.e., toward the battery cells 3 when flowing through the first wall passage 611.

Air that flows of the outflow parts flows into each inter-battery passages 310, 320 led by the sucking force of the blower 4, and flows down while contacting each battery cell 3.

Air that reaches the side wall 24 via the outflow part for communication from the first wall passage 611 flows through the first wall passage 612 while contacting the side wall 24.

Air that reaches the downstream side end 991 of the inner wall 99 flows out the first wall passage 612 from the outflow part disposed between the inner wall 99 and the inner wall 94, and flows out toward the central part of the sealed space, i.e., toward the battery cells 3.

Furthermore, air led by the sucking force of the blower 4 flows into the inter-battery passages 310, 320, and flows down while contacting each battery cell 3.

Moreover, air that flows through the second wall passage 621 flows toward the side wall 24 while contacting the side wall 22.

A part of this air flows out from four outflow parts disposed between adjoining inner walls toward the central part of the sealed space, i.e., toward the battery cells 3 when flowing through the second wall passage 621.

Led by the sucking force of the blower 4, air flows out of the outflow parts, and further flows into each inter-battery passages 310, 320 and flows down while contacting each battery cell 3.

Air that reaches the side wall 24 via the outflow part for communication from the second wall passage 621 flows through the second wall passage 622 while contacting the side wall 24.

Air that reaches the downstream side end 941 of the inner wall 94 flows out the second wall passage 622 from the outflow part disposed between the inner wall 94 and the inner wall 99, and flows out toward the central part of the sealed space, i.e., toward the battery cells 3.

Furthermore, air flows into the inter-battery passages 310, 320, and flows down while contacting each battery cell 3.

Thus, in sealed space, circulating air is divided into two from the discharge part 421 of the blower 4, and flows toward the battery cells 3 after passing through the process of contacting with the bottom wall 23 and three side walls, respectively, air returns to suction part 420 of the blower 4 via the battery cells 3.

That is, circulating air cools each battery cell by absorbing heat from outer surfaces of the bus bars 300, the electrode terminals 30, and each battery cell 3 when flowing through the inter-battery passages 310, 320.

Air that has cooled each battery cell 3 is brought together in the suction part 420 by the sucking force of the blower 4, and blows again from the discharge part 421.

The circulating air that blowing-off from the discharge part 421 reaches to the projecting portion 5, and is again divided into the first branching passage 610 and second branching passage 620.

Air that flows through the first branching passage 610 circulates the first wall passage 611, 612 guided by the passage forming member 9, and air that flows through the second branching passage 620 circulates the second wall passage 621, 622 guided by the passage forming member 9.

Thus, air that circulates in the sealed space releases heat absorbed during the heat-exchange with each battery cell 3 to outside of the case 2 through the side wall 20, the bottom wall 23, and the first heat-release accelerating portions 230 when flowing through the first branching passage 610 and the second branching passage 620.

The heat released through the side wall 20, the bottom wall 23, and the first heat-release accelerating portions 230 is released to outside of the case 2 by natural convection.

Furthermore, since air flows so as to flow along the side wall 21 guided by the passage forming member 9 when flowing through the first wall passage 611 via the first branching passage 610, air flows while contacting a large area of the side wall 21.

By this, an area in which air contacts with of the surface of the side wall 21 near the side wall 24 expands, and heat is released to outside of the case 2 through the side wall 21 and the second heat-release accelerating portions 210.

Furthermore, since air flows so as to flow along the side wall 24 guided by the passage forming member 9 when flowing through the first wall passage 612, air flows while contacting a large area of the side wall 24.

By this, an area that air contacts with of the surface of the side wall 24 near the center expands, and heat is released to outside of the case 2 through the side wall 24.

Moreover, since air flows so as to flow along the side wall 22 guided by the passage forming member 9 when flowing through the second wall passage 621 via the second branching passage 620, air flows while contacting a large area of the side wall 22.

By this, an area that air contacts with of the surface of the side wall 22 near the side wall 24 expands, and heat is released to outside of the case 2 through the side wall 22 and the second heat-release accelerating portions 220.

Furthermore, since air flows so as to flow along the side wall 24 guided by the passage forming member 9 when flowing through the first wall passage 622, air flows while contacting a large area of the side wall 24.

Therefore, an area that air contacts with of the surface of the side wall 24 near the center expands, and heat is released to outside of the case 2 through the side wall 24.

Therefore, all of the bottom wall 23, the side wall 21, the side wall 22, and side wall 24 function as heat releasing surfaces when releasing outside the heat of the battery cells 3 that moved to the air circulating through the sealed space.

Moreover, it is desirable that the bottom wall 23 is a wall that has the largest surface area among the plurality of walls that forms the case 2.

Since the bottom wall 23 is the wall having the largest surface area in the walls of the case 2, the heat releasing effect from the wall part where the air blown from the blower 4 contacts at first to outside can be improved, and can cool the batteries effectively.

Especially, since air just blown from the blower 4 suffers little air-flow resistance, the amount of air seldom falls.

Therefore, according to the battery cooling system 1, heat is released broadly in the heat releasing through the walls of the case 2, thus a large heat releasing effect is acquired.

Next, functions and effects that the battery cooling system 1 of the first embodiment brings are explained.

The battery cooling system 1 has the case 2 that forms the sealed space surrounded by the plurality of walls and the plurality of battery cells 3 are accommodated in the sealed space, a fluid driving unit accommodated in the sealed space that circulates the fluid for cooling the plurality of battery cells 3 inside the case 2, and the passage forming member 9 (wall passage forming member).

The passage forming member 9 forms the wall passages 611, 612, 621, and 622 disposed along the case 2 between at least one of the walls among the plurality of walls that forms the case 2.

The passage forming member 9 has the inflow part and the outflow part. The inflow part is the part where the fluid flowing out of fluid driving unit before contacting the battery cells 3 passes when flowing into the wall passage. The outflow part is the part where the fluid flowed in from the inflow part into the wall passage passes when flowing out from the wall passage.

According to this composition, the flow contacting the walls of the case 2 by circulating the fluid flowing out of the fluid driving unit and before contacting the battery cells 3 in the wall passage by the passage forming member 9 can be formed.

Furthermore, by providing the fluid flowing down the wall passage from the outflow part, the fluid can be directed to the battery cells 3 or other walls.

Thus, it is possible for the fluid that circulates through the sealed space to be spread to the wide range of the walls in the case 2 during the circulation process of the flow.

There by, the fluid flow sent from the fluid driving unit can accelerate the heat releasing through the walls of the case 2 before the fluid reaches the battery cells 3, and can offer the fluid flow contacting a large area of the battery cells 3.

Therefore, compared with the conventional technology, a battery cooling system 1 that can release heat outside of the case 2 efficiently can be offered.

Moreover, the outflow part of the passage forming member 9 includes the outflow part for communication that faces the adjoining walls so that the fluid that circulates through the wall passages 611, 621 flows out the wall passage and also flows along the adjoining walls.

According to this composition, the fluid flow directed to the battery cells 3 can be formed after making the fluid that flows while contacting the side walls 22, 21 and further contacting also the side wall 24.

Therefore, the amount of heat released to the outside through the wall of the case 2 can be increased, and the heat releasing effect of the battery cooling system 1 can further be improved.

Moreover, the passage forming member 9 has a plurality of outflow parts where the fluid flows out from the wall passages 611, 612, 621, and 622.

The plurality of outflow parts is disposed in the flowing direction of the fluid that flows through the wall passage with intervals therebetween.

The fluid that flows out from these outflow parts flows towards the battery cells 3.

According to this composition, the fluid flow that contacts the walls of the case 2 and increases the external heat release can be formed before heat-exchanging with the battery cells 3, while the cooling by the direct heat exchange with the batteries can be performed by directing a part of the fluid to the battery cells 3 during the fluid flow.

There by, the battery cooling system 1 that can balance the heat releasing through the case walls and the direct cooling of the batteries can be offered.

Moreover, the passage forming member 9 is constituted from the inner walls 90, 91, 92, and 93 that are disposed with intervals between the walls of the case 2 that forms the sealed space so that at least a single wall of the case 2 faces the inner walls.

According to this composition, the wall passage 621 that extends along the side wall 22 can be formed by the inner wall disposed with the interval between the case walls.

Therefore, the battery cooling system 1 that can set the heat releasing effect through the case walls to the required performance can be offered by setting length and breadth, positions, and the number of the inner walls.

Furthermore, the outflow parts are the openings formed in the inner walls that are disposed with the interval between the walls of the case 2.

Thereby, the battery cooling system 1 where the amount of heat released through the case walls can be easily adjusted can be offered by setting the number, sizes, and positions of the openings formed in the inner wall.

Moreover, the wall passage includes the passage (for example, the wall passage 611, 621) disposed along each of the walls (for example, the side walls 21, 22) of the case disposed facing each other with the plurality of battery cells 3 in between.

Accordingly, a fluid driving unit can produce a fluid flow that contacts two mutually distant walls before contacting the battery cell 3.

Therefore, the amount of heat released to outside through the walls of the case 2 can be increased, and the heat releasing effect of the battery cooling system 1 can further be improved.

Furthermore, since it becomes possible to make the fluid contacting other walls before the fluid reaching the wall in which the fluid faces, the amount of heat released through the walls of the case 2 can further be increased.

Moreover, the battery cooling system 1 further has the wall passages 612, 622 disposed along the other wall (for example, side wall 24) that adjoins to both of the walls of the case 2 facing each other with the plurality of battery cells 3 in between.

According to this, a series of fluid flows that makes the fluid flowing out of a fluid driving unit and before contacting the battery cell 3 contacting two walls in the mutually distant positions, and also contacting the other wall that adjoins to the both can be formed.

Therefore, the amount of heat released to outside through the wall of the case 2 can further be increased, and the heat releasing effect can further be improved.

Moreover, the internal space of the case 2 is the sealed space.

A fluid driving unit is accommodated in the sealed space together with the plurality of battery cells 3, and generates the fluid flow that circulates in the sealed space.

According to this composition, since the fluid circulates in the sealed space within the case 2 and is kept moving, the fluid can contact all the walls of the case 2 during the circulation.

Thus, since there is no inflow or outflow of fluid from the case 2, and the amount of cooling fluid that contacts with the wall of the case 2 can be increased, a surface area of the case 2 that functions as a heat releasing surface to outside can be enlarged.

Therefore, heat generated by the battery cells 3 can be positively released to outside using the entire walls of the case 2.

Moreover, noise to outside can be reduced as well as dust, humidity, etc. can be prevented from getting into the case 2.

Moreover, the circulation passage formed in the sealed space of the case 2 is surrounded by the plurality of walls that forms the case 2.

Thus, since the plurality of walls of the case 2 that surrounds the circulation passage is utilizable as a heat releasing medium, the heat releasing area to the outside can be enlarged, and heat releasing can be increased to outside of the case 2.

Thereby, the heat route that exhausts heat generated by the battery cells 3 to outside of the case 2 can be formed effectively.

That is, the effective battery cooling that utilizes the entire walls of the case 2 as the heat releasing area is realizable.

Moreover, the plurality of passages divided by a multiple passage forming unit includes two passages (the first branching passage 610 and the second branching passage 620) through which the fluid flows in mutually opposite directions.

The term the fluid flows in mutually opposite directions here includes not only a case where a vector of a mutual flow is 180 degrees, but includes a case where the fluid flows at some angle towards two case walls that are mutually facing each other.

According to this composition, the fluid from the fluid driving unit can be broadly supplied in the internal space of the case 2.

Therefore, the heat generated from the plurality of battery cells 3 can be positively released to outside through a wide-ranging walls of the case 2.

Moreover, a multiple passage forming unit is composed of the projecting portion 5 disposed so as to project from the wall of the case 2.

The fluid sent from the fluid driving unit flows toward the projecting portion 5, and by the projecting portion 5, the fluid is divided in to at least two directions and forms a plurality of passages.

According to this composition, formation of the plurality of passages by dividing the fluid sent from a fluid driving unit into two different directions can be realized by the projection disposed on the wall of the case 2.

Therefore, heat released through the case walls can be performed without requiring a complicated composition or a mechanism.

Moreover, it is also possible for the projections such as the projecting portion 5 to function as a heat collecting part.

Further, the projecting portion 5 has at least two slopes 5a, 5b that extend in the mutually different direction.

The fluid flowing from the fluid driving unit toward the projecting portion 5 flows along each of the slope 5a, slope 5b, and is divided into at least two directions.

According to this composition, since the circulation resistance can be suppressed by dividing the fluid flow along the slopes 5a, 5b, drop in flow rate can be suppressed when fluid is contacted with the walls of the case 2.

Therefore, since a smooth fluid flow can be formed when dividing the passage in the sealed space, effective heat releasing through the walls of the case 2 can be performed.

Moreover, the projecting portion 5 is formed so that it projects from the bottom wall 23 that constitutes a part of the case 2.

The fluid driving unit sends the fluid below towards the projecting portion 5.

According to this composition, formation of the plurality of passages by dividing the fluid sent from a fluid driving unit into two different directions can be realized by the projection disposed on the bottom wall 23 of the case 2.

Therefore, the heat releasing through the side walls can be performed without requiring complicated composition and a mechanism.

Furthermore, the fluid can be supplied by using gravity by sending the fluid towards below from the fluid driving unit.

Thereby, since the fluid can be sent to the walls of the case 2 without reducing the flow rate very much, the amount of heat released through the case walls can be enlarged, and it can contribute to the outstanding heat releasing efficiency.

The case 2 has the first heat-release accelerating portions 230 for expanding the surface area exposed to outside on the outer surface that is exposed to outside and is the back side of the wall where the projecting portion 5 is formed.

According to this composition, the heat-releasing route that releases the heat to outside of the case 2 through the bottom wall 23 can be built when the circulating fluid flows through the first branching passage 610 and the second branching passage 620 that constitute the plurality of passages.

Thus, the fluid driving unit has a good flow rate, and heat can be emitted from the first heat-release accelerating portions 230 through the bottom wall 23.

For this reason, the battery cooling system 1 with high heat releasing efficiency can be offered.

Furthermore, the case 2 has the second heat-release accelerating portions 210, 220 that expand the surface area exposing outside on the other surfaces, i.e., the side walls 21, 22 that adjoin the outer surface where the first heat-release accelerating portions 230 are disposed.

According to this composition, the heat can be released from the second heat-release accelerating portions 210, 220 through the case walls before the fluid sent from the fluid driving unit contacts the battery cells 3.

For this reason, the battery cooling system 1 with higher heat releasing efficiency can be offered.

Moreover, it is desirable that a wall (the bottom wall 23) that the fluid circulating in the sealed space contacts when flowing through two passages (the first branching passage 610 and second branching passage 620) into mutually opposite directions is a wall that has the largest surface area among the plurality of walls that forms the case 2.

According to this composition, the wall that the powerful fluid flow sent from the fluid driving unit contacts first has the largest surface area in the walls of the case 2.

Thereby, the heat releasing effect to outside can be enlarged and further battery cooling effect can be obtained.

In addition, the case 2 is not limited to have only one wall that has the largest surface area, but also can have more than one wall that each has the largest surface areas.

[The Second Embodiment]

Figure 4:
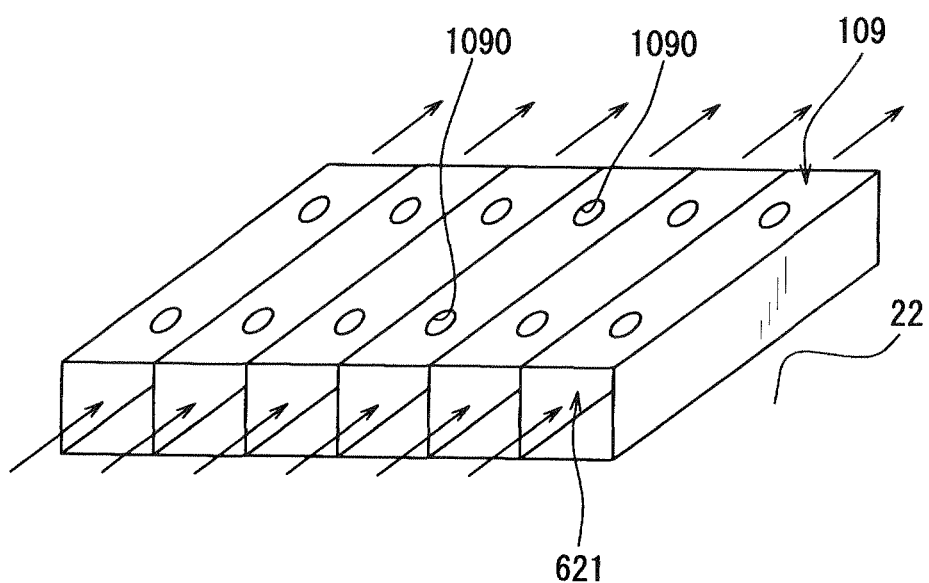
FIG. 4 shows a perspective view of a wall passage forming member in a second embodiment.
Figure 5:
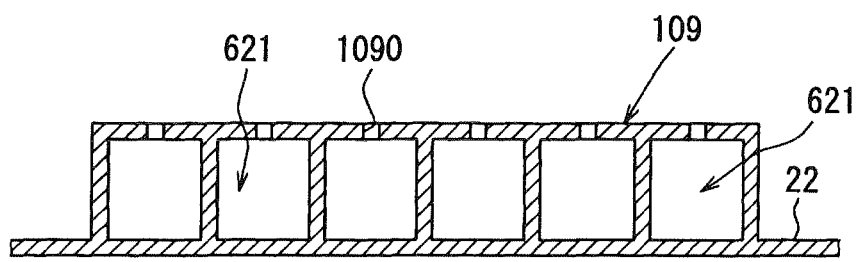
FIG. 5 shows a sectional view of the wall passage forming member in the second embodiment.

The second embodiment explains a passage forming member 109, which has a different form than the above-mentioned embodiment, with reference to FIG. 4 and FIG. 5.

In FIG. 4 and FIG. 5, components having the same composition as the first embodiment are given the same reference numerals, and have the same functions and effects.

In addition, compositions, functions, and effects that are not explained in particular in the second embodiment are the same as those of the above-mentioned embodiment.

Hereinafter, only different points from the above-mentioned embodiment are explained.

The passage forming member 9 of the above-mentioned embodiment can be replaced by the passage forming member 109 explained below.

In a case that forms the sealed space, the passage forming member 109 of the second embodiment is a component formed integrally with at least a single wall.

The passage forming member 109 is constituted by a duct-shaped member with both ends that are opened.

Since the passage forming member 109 is constituted by the duct-shaped member, a wall passage is formed inside of its duct-shaped body.

The wall passage disposed along each wall should just be at least one passage.

A plurality of penetration holes as outflow parts of fluid are formed on a side wall of the duct-shaped member that faces the wall of the case.

As for an example, as shown in FIG. 4 and FIG. 5, the passage forming member 109 formed integrally with the side wall 22 is explained.

The passage forming member 109 forms a plurality of passages along at least a single wall by integrating a plurality of duct-shaped members.

Both ends of the plurality of duct-shaped members are open.

A passage that extends in an axial direction of the cylindrical object is formed between the both ends.

Therefore, the passages that extend toward the side wall 24 from the side wall 20 are disposed in an inner side of the side wall 22, and each passage or the collective passages constitute a wall passage 621.

Thus, the passage forming member 109 constitutes a component that forms the wall passage disposed along the wall between at least a single wall among the plurality of walls that forms the case 102 by forming the passage that is disposed integrally and thermally connected with the side wall by itself.

In the passage forming member 109, a plurality of penetration holes 1090 as the outflow parts of the fluid are formed on the side wall that faces the wall of the case 102.

Moreover, a plurality of penetration holes 1090 is formed along a fluid flowing direction or the axial direction of the duct-shaped member.

Therefore, a part of the fluid that flows into the wall passage 621 from the opening end located in the side wall 20 side flows out from the penetration hole 1090s on the way and flows toward the battery cell 3, while the remainder flows out from the other opening end located in the side wall 24 side, and flows down toward the side wall 24.

According to the passage forming member 109 of the second embodiment, since the duct-shaped member is integrated with the side wall 22 and the wall passage 621 is constituted therein, the wall of the case can be reinforced, while a surface area releasing heat through the case wall can be increased.

Furthermore, since an area that cooling fluid contacts is expandable by the side wall that constitutes the duct-shaped member, the passage forming member 109 can have a function as a fin for transferring heat.

[The Third Embodiment]

Figure 6:
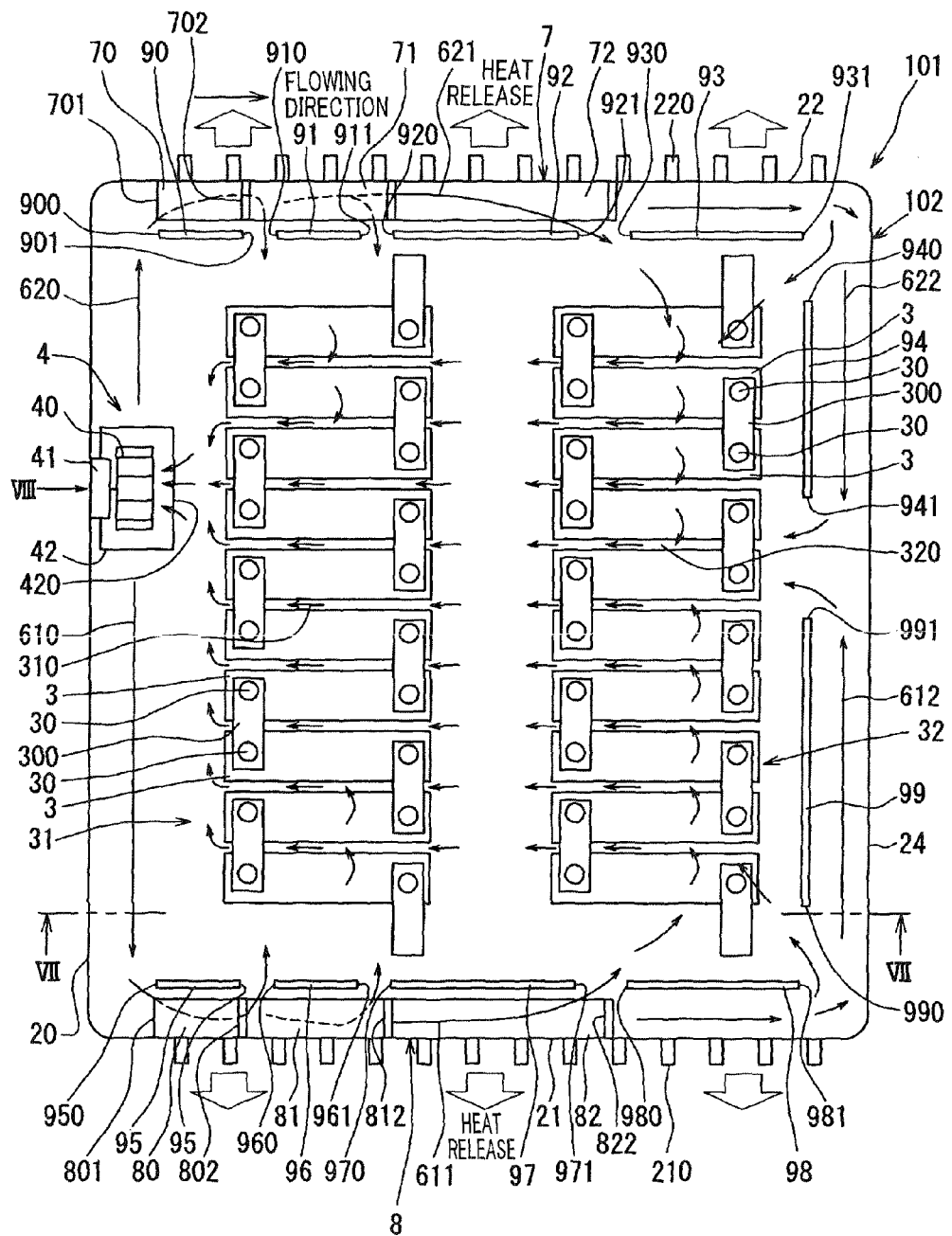
FIG. 6 shows a schematic diagram for explaining a composition of a system and a flow of fluid for cooling a battery of a battery cooling system in a third embodiment.
Figure 7:
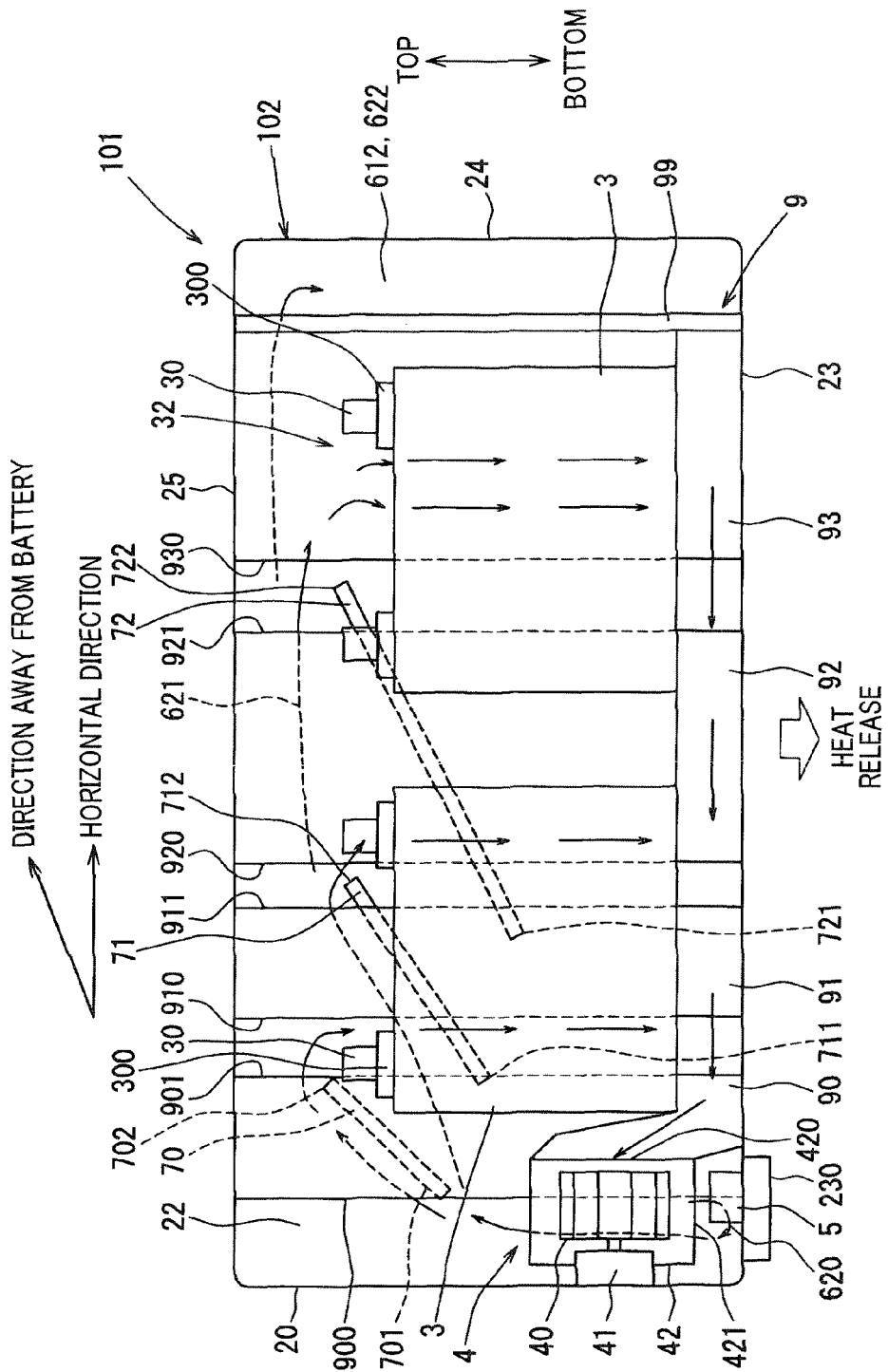
FIG. 7 shows a sectional view taken along a line VII-VII of FIG. 6.
Figure 8:
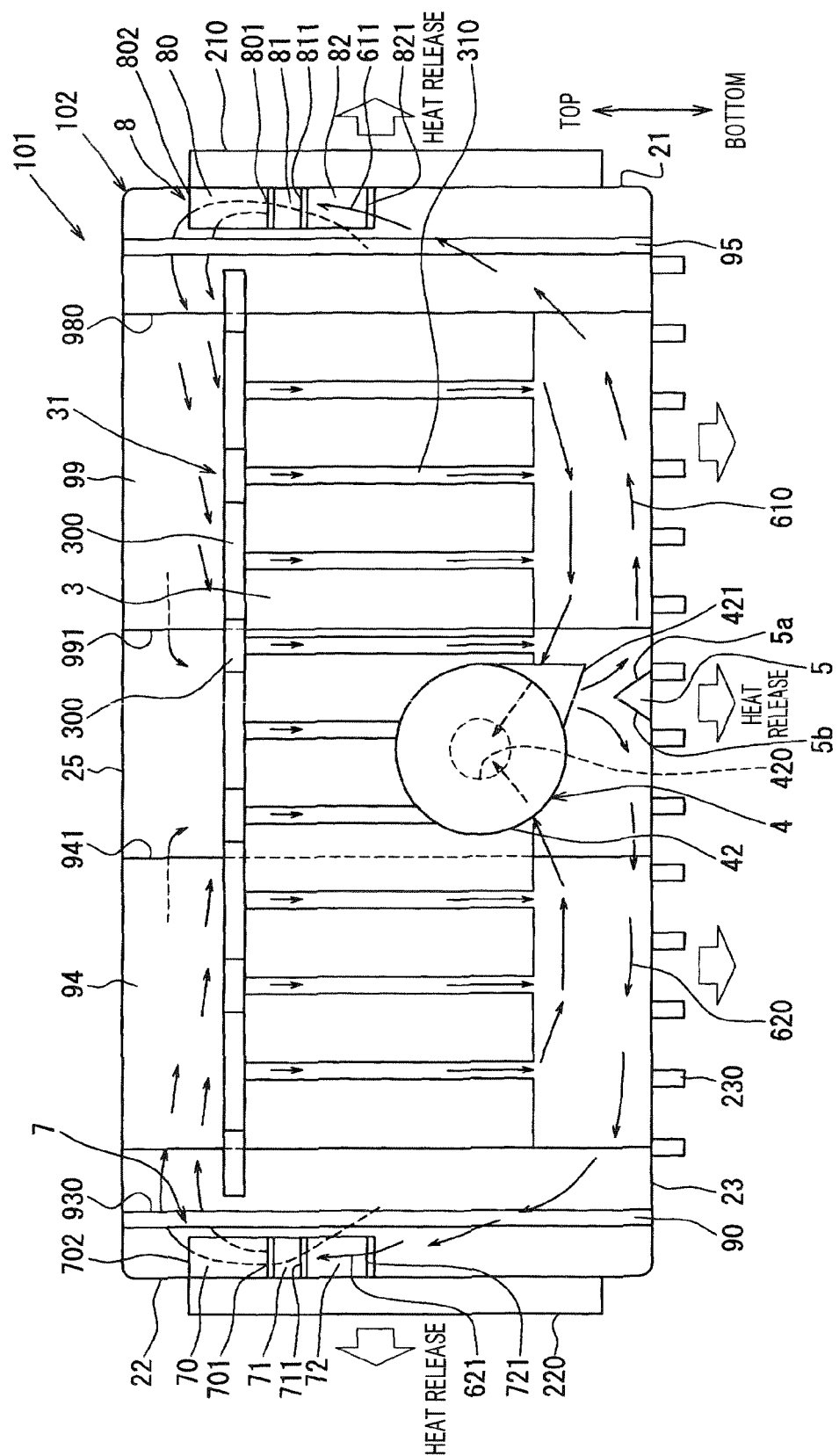
FIG. 8 shows a schematic diagram of an inside of a case when seen in a direction of an arrow VIII of FIG. 6.

The third embodiment explains a battery cooling system 101, which has a different form than the previous embodiments, with reference to FIG. 6 to FIG. 8.

In FIG. 6 to FIG. 8, components having the same composition as the first embodiment are given the same reference numerals, and have the same functions and effects.

In addition, compositions, functions, and effects that are not explained in particular in the third embodiment are the same as those of the previous embodiments.

Hereinafter, only different points from the previous embodiments are explained.

The passage forming member 109 of the above-mentioned second embodiment can be replaced by the passage forming member 9 of the third embodiment.

The battery cooling system 101 of the third embodiment further has a fluid flow guiding unit 7, 8.

The fluid flow guiding unit 7, 8 is formed on one of the walls of the case 102 that forms the sealed space to the battery cooling system 1 of the first embodiment, and guides the fluid that flows out from the fluid driving unit in the direction away from the battery cells 3.

The fluid flow guiding unit 7, 8 is formed on the walls of the case 102 that forms the sealed space, and has a function to guide the fluid that flows out from the fluid driving unit in the direction away from the battery cells 3.

The fluid flow guiding unit 7 is projected from the side wall 22, and is constituted by three projecting portions 70, 71, 72 extending in a direction away from the plurality of battery cells 3 that faces the side wall 22.

The fluid flow guiding unit 8 is projected from the side wall 21, and is constituted by three projecting portions 80, 81, 82 extending in a direction away from the plurality of battery cells 3 that faces the side wall 21.

The battery cooling system 101 has the plurality of projecting portions projected from each of the walls (the side wall 21, the side wall 22) of the case 102. The walls face each other with the plurality of battery cells 3 disposed therebetween.

Each projecting portion may be a separate part adhered to the side wall 21, 22, or may be a part of the side wall 21, 22 formed integrally by molding etc. from the beginning.

The projecting portions 70, 71, 72, 80, 81, 82 may be divided into a plurality of forms.

For example, each projecting portion may be a single eaves-shaped projecting portion extending continuously obliquely upward towards the side wall 24 side from the side wall 20 side, or may be a plurality of eaves-shaped projecting portions disposed with intervals therebetween.

The plurality of eaves-shaped projecting portions can guide the fluid in the direction away from the battery cells 3 as a whole by being arranged side by side.

Each projecting portion is located higher than the discharge part 421 of the blower 4 that forms the outflow part of the fluid of the fluid driving unit.

That is, each projecting portion is disposed in the position higher than the discharge part 421.

The projecting portion 70 is a belt-like projecting portion continuously extended to a top end part 702 from a bottom end 701. The top end part 702 is disposed in a position where a distance from the discharge part 421 is longer than that of the bottom end 701.

The projecting portion 71 is a belt-like projecting portion continuously extended to a top end part 712 from a bottom end 711. The top end part 712 disposed in a position where a distance from the discharge part 421 is longer than that of the bottom end 711.

The projecting portion 72 is a belt-like projecting portion continuously extended to a top end part 722 from a bottom end 721. The top end part 722 is disposed in a position where a distance from the discharge part 421 is longer than that of the bottom end 721.

Each top end part 702, 712, 722 of each projecting portion 70, 71, 72 is formed so as to be positioned higher than a top end of the exterior case of the battery cell 3.

Moreover, top end part 702, 712, 722 of each projecting portion 70, 71, 72 may be formed so as to be located at the same height with the top end of the exterior case of the battery cell 3.

Therefore, the fluid that flows through the second wall passage 621 is guided by each projecting portion 70, 71, 72, to flow to a position higher than the top end of exterior case of the battery cell 3.

The projecting portions 70, 71, 72 are formed on the side wall 22 that forms the wall of the case 102.

As shown in FIG. 7, the plurality of projecting portions 70, 71, 72 are disposed in a horizontal direction.

Each of the projecting portions 70, 71, 72 is the eaves-shaped portion extending obliquely upward in the side wall 22.

The projecting portions 70, 71, 72 are disposed in the same, or substantially the same direction so as to allow fluid to flow along mutually.

The projecting portion 70 is disposed in a position nearest to the discharge part 421 in the horizontal direction among the projecting portions.

The projecting portion 72 is disposed in a position most distant to the discharge part 421 in the horizontal direction among the projecting portions.

The projecting portion 71 is disposed between the projecting portion 70 and the projecting portion 72.

The length extending from a bottom end to a top end of the projecting portion 72 is the longest among the plurality of projecting portions.

Each of the projecting portions 80, 81, 82 that constitute the fluid flow guiding unit 8 has a relation corresponding to the projecting portion 70, the projecting portion 71, and the projecting portion 72, respectively.

Therefore, the projecting portion 80 has the same feature as the projecting portion 70, and has the same functions and effects.

A bottom end part 801 corresponds to the bottom end part 701, while a top end part 802 corresponds to the top end part 702.

Moreover, the projecting portion 81 has the same feature as the projecting portion 71, and has the same functions and effects.

A bottom end part 811 corresponds to the bottom end part 711, while a top end part 812 corresponds to the top end part 712.

Further, the projecting portion 82 has the same feature as the projecting portion 72, and has the same functions and effects.

A bottom end part 821 corresponds to the bottom end part 721, while a top end part 822 corresponds to the top end part 722.

When the blower 4 is operated, air is blown towards the projecting portion 5 from the discharge part 421 of the blower 4.

Air that reaches the projecting portion 5 is divided into the first branching passage 610 and second branching passage 620 by the function of the projecting portion 5.

The air that flows through the first branching passage 610 reaches the side wall 21 contacting the bottom wall 23, and flows into the first wall passage 611.

The air that flows through the first wall passage 611 flows in the direction away from the battery cell 3 guided by the plurality of projecting portions 80, 81, 82 while contacting the side wall 21.

On the other hand, the air that flows through the second branching passage 620 reaches the side wall 22 contacting the bottom wall 23, and flows into the second wall passage 621.

The air that flows through the second wall passage 621 flows in the direction away from the battery cell 3 guided by the plurality of projecting portions 70, 71, 72 while contacting the side wall 22.

Air that flows through the first wall passage 611 rises obliquely from a lower part near the side wall 20 towards an upper part near the side wall 24 while contacting the side wall 21 by the fluid flow guiding unit 8, and flows toward the side wall 24.

During flowing through the first wall passage 611, a part of air flows towards the center of internal space led by the sucking force of the blower 4 from the parts above the upper end surface of the battery cell 3 of the four outflow parts disposed between adjoining inner walls.

Air that flows out of the outflow parts flows into each inter-battery passages 310, 320, and flows down while contacting each battery cell 3.

Air that reaches the side wall 24 through the first wall passage 611 and the outflow part for communication flows through the first wall passage 612 while contacting the side wall 24.

Air that reaches the downstream side end 991 of the inner wall 99 comes out of the first wall passage 612 from the outflow part disposed between the inner wall 99 and the inner wall 94, and flows out toward the central part side of the sealed space, i.e., the battery cells 3.

Air flows into each inter-battery passages 310, 320, by the sucking force of the blower 4, and flows down while contacting each battery cell 3.

Air that flows through the second wall passage 621 rises obliquely from a lower part near the side wall 20 towards an upper part near the side wall 24 while contacting the side wall 22 by the fluid flow guiding unit 8, and flows toward the side wall 24.

During flowing through the first wall passage 621, a part of air flows towards the center of internal space led by the sucking force of the blower 4 from the parts above the upper end surface of the battery cell 3 of the four outflow parts disposed between adjoining inner walls.

Furthermore, air flows out of the outflow parts and flows into each inter-battery passages 310, 320, and flows down while contacting each battery cell 3.

Air that reaches the side wall 24 through the first wall passage 621 and the outflow part for communication flows through the first wall passage 622 while contacting the side wall 24.

Air that reaches the downstream side end 941 of the inner wall 94 comes out of the second wall passage 622 from the outflow part disposed between the inner wall 99 and the inner wall 94, and flows out toward the central part side of the sealed space, i.e., the battery cells 3.

Air flows into each inter-battery passages 310, 320, by the sucking force of the blower 4, and flows down while contacting each battery cell 3.

Thus, air that circulates in the sealed space of the case 102 releases heat absorbed during the heat-exchange with each battery cell 3 to outside of the case 102 through the side wall 20, the bottom wall 23, and the first heat-release accelerating portions 230 when flowing through the first branching passage 610 and the second branching passage 620.

The heat released through the bottom wall 23 and the first heat-release accelerating portions 230 is released to outside of the case 102 by natural convection.

Furthermore, since air flows upward and away from the battery cells 3 are guided by the passage forming member 8 when flowing through the first wall passage 611 via the first branching passage 610, air flows while contacting a large area of the side wall 21.

By this, an area that air contacts with of the surface of the side wall 21 near the side wall 24 expands, and heat is released to outside of the case 102 through the side wall 21 and the second heat-release accelerating portions 210.

Furthermore, since air flows upward and away from the battery cells 3 are guided by the passage forming member 7 when flowing through the second wall passage 621 via the first branching passage 620, air flows while contacting a large area of the side wall 22.

By this, an area that air contacts with of the surface of the side wall 22 near the side wall 24 expands, and heat is released to outside of the case 102 through the side wall 22 and the second heat-release accelerating portions 220.

Next, functions and effects that the battery cooling system 101 of the third embodiment brings are explained.

The battery cooling system 101 has the fluid flow guiding unit 7, 8 in the case 102.

The fluid flow guiding unit 7, 8 are formed in the walls of the case 102 that forms sealed space, and the fluid that flows out of the fluid driving unit is guided in the direction away from the battery cells 3.

According to this composition, the fluid flow guided away from the battery cells 3 can be formed by the fluid flow guiding unit 7, 8 while contacting the walls of the case 102.

The fluid flowing out of the fluid driving unit and before contacting the battery cell 3 where the flow rate is maintained can be spread to the wide range of the walls in the case 102.

There by, the fluid flow sent from the fluid driving unit can accelerate the heat releasing through the walls of the case 2 before the fluid reaches the battery cells 3.

Moreover, the fluid flow guiding unit 7, 8 are constituted by the projecting portions extending in the direction away from the battery cells 3 while projecting from the walls of the case 2.

According to this composition, the fluid flow guiding unit 7, 8 can be realized without requiring special composition.

Moreover, since the fluid flow guiding unit 7, 8 are realizable by providing projecting portions in the walls of the case 102, it is not necessary to manage other parts and is useful when manufacturing.

Moreover, the projecting portions of the above-mentioned shape can function also as heat collecting plates that collect the heat from the fluid, and can contribute to heat release through the walls.

Moreover, the outflow parts of the fluid in the fluid driving unit are positioned lower than the projecting portions that form the fluid flow guiding unit 7, 8.

The projecting portions are the projecting portions 70, 71, 72 continuously extending from the bottom ends 701, 711, 721 to the top end parts 702, 712, 722 that are disposed in the position where the distance from the outflow part is farther than the bottom end.

According to this composition, the flow flowing upwardly from the outflow part of the fluid driving unit can be formed in the sealed space before the fluid that flows out of the fluid driving unit contacts the battery cells 3.

Further, the fluid flow in the direction that extends from each bottom end part to each top end part can be formed while contacting the side walls 21, 22.

Moreover, the top end parts 702, 712, 722 of the projecting portions 70, 71, 72 are positioned at the same height or higher than the top end of the exterior case of the battery cell 3.

According to this composition, since the fluid that flows through the second wall passage 621 is guided by each projecting portion 70, 71, 72, the fluid flows to a position higher than the top end of the exterior case of the battery cell 3.

Further, the fluid that flows higher than the top end of the exterior case flows into the inter-battery passages 310 and the inter-battery passages 320 so as to flow down from the upper part of the sealed space by the sucking force of the blower 4.

Thus, the fluid flow reaching far and wide in the vertical direction can be formed in the sealed space.

Furthermore, since the fluid flow that reaches far and wide in the vertical direction and contacts the side walls 21, 22 can be formed, heat releasing area through the side walls can be enlarged, and it can fully be utilized as a heat releasing medium.

Moreover, the plurality of projecting portions is disposed in the same wall of the case 102.

The plurality of projecting portions 70, 71, 72 are disposed in the horizontal direction.

According to this composition, the fluid flow that flows along the walls of the case 102 can be formed in layers that have the projecting portions in between.

Therefore, since a plurality of layered flows is formed, the fluid flow guided in the direction away from the battery cell 3 can be expedited while contacting the side walls 21, 22.

Moreover, in the plurality of projecting portions 70, 71, 72, the projecting portion 72 positioned the most distant from the outflow part in the horizontal direction has the longest length extended from the bottom end part 721 to the top end part 722 among the plurality of projecting portions 70, 71, 72.

According to this composition, before contacting the battery cells 3, the fluid can be guided to a place away from the fluid driving unit in the sealed space by the projecting portion 72 that is the most distant from the fluid driving unit.

Therefore, since the fluid can be delivered near the side wall 24 while contacting the side walls 21, 22, heat releasing area through the side walls can be enlarged, and it can be fully utilized as a heat releasing medium.

Moreover, the projecting portions are projected from each of the walls (the side wall 21, the side wall 22) of the case 102. The walls face each other with the plurality of battery cells 3 disposed therebetween.

According to this composition, since the fluid that flows while contacting the two facing side walls 21, 22 can be formed, the heat releasing area through the side walls is fully obtainable.

[The Fourth Embodiment]

Figure 9:
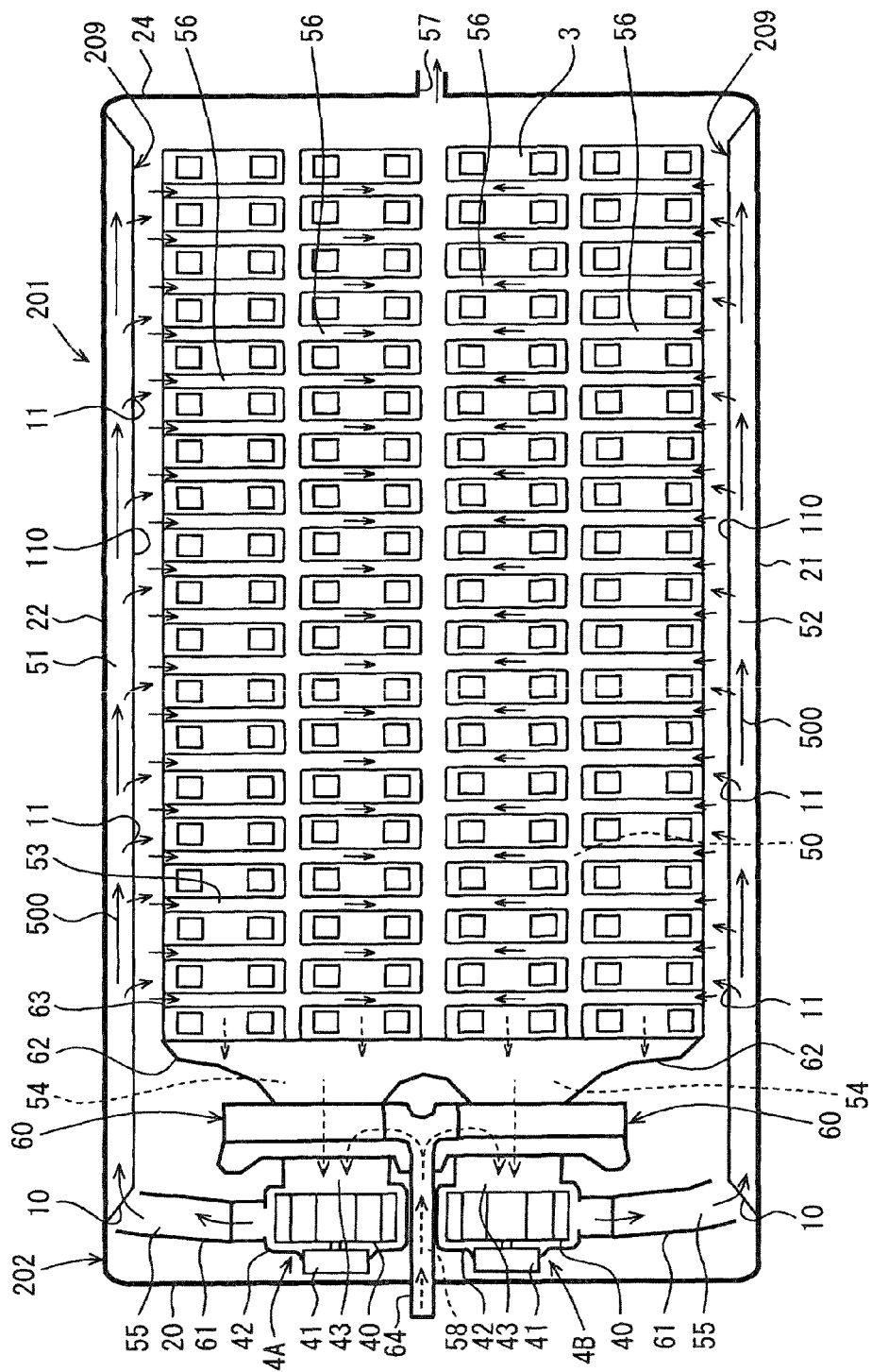
FIG. 9 shows a schematic diagram for explaining a composition of a system and a flow of fluid for cooling a battery of a battery cooling system in a fourth embodiment.
Figure 10:
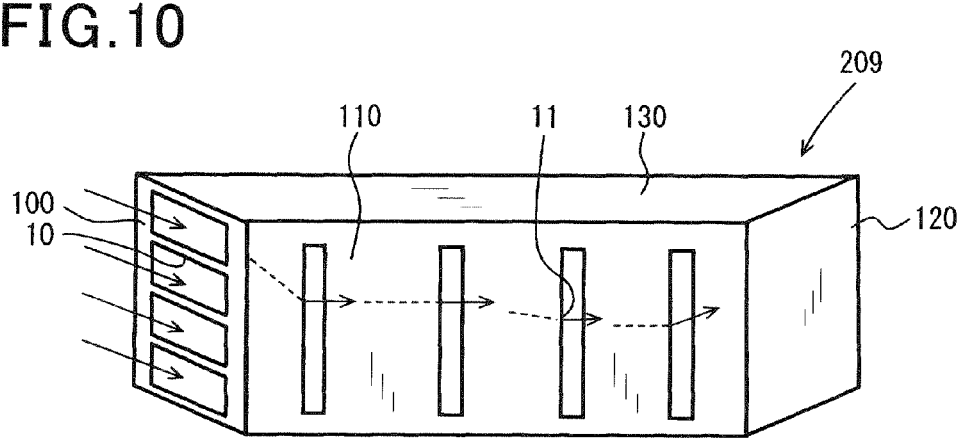
FIG. 10 shows a figure of the wall passage forming member and the flow of the fluid in the fourth embodiment.
Figure 11:
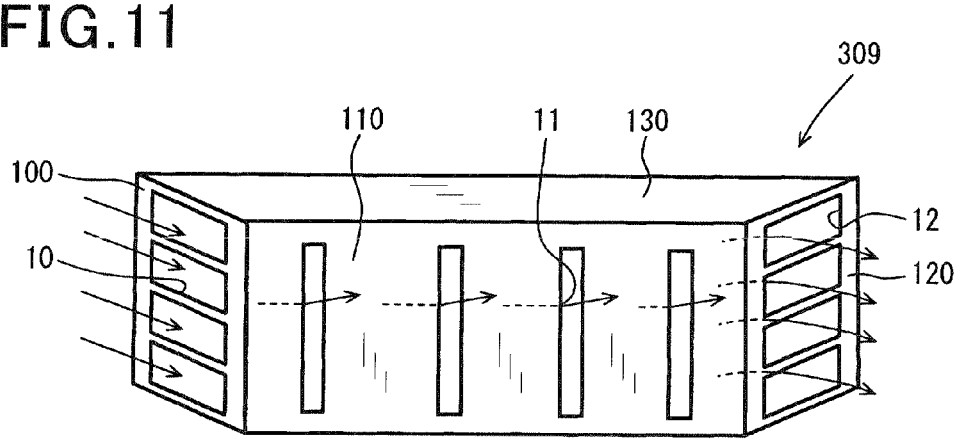
FIG. 11 shows a figure of the wall passage forming member and the flow of the fluid of another example in the fourth embodiment.

The fourth embodiment explains a battery cooling system 201, which has a different form from previous embodiments, with reference to FIG. 9 to FIG. 11.

In FIG. 9 to FIG. 11, components having the same composition as the first embodiment are given the same reference numerals, and have the same functions and effects.

In addition, compositions, functions, and effects that are not explained in particular in the fourth embodiment are the same as those of the previous embodiments.

Hereinafter, only different points from the previous embodiments are explained.

The battery cooling system 201 has a group battery composed of a plurality of battery cells 3, a case 202 where the group battery is accommodated, and blowers 4A, 4B that circulate fluid within the case 202.

The battery cooling system 201 is also called a battery pack.

The two blowers 4A, 4B are installed in the case 202, and are disposed side by side. The two blowers 4A, 4B are examples of a fluid driving unit.

The circulating flow passage 500 that forms a circulating course of the fluid that flows forcibly by the blowers 4A, 4B which are formed in the case 202.

The circulating flow passage 500 is a flow passage where the fluid circulates disposed in an internal space surrounded by the case 202.

The circulating flow passage 500 forms a circulating course for the fluid (for example, air) that is sucked into the blowers 4A, 4B after the fluid blown from the blowers 4A, 4B exchanges heat with the battery cells 3.

That is, in the case 202, there is provided one part where the fluid flows out for each blower 4A, 4B, and one part where the fluid flows into for each blower 4A, 4B.

Therefore, the fluid inside the case 202 reloably circulates through the circulation passage 500 via the blowers 4A, 4B.

The circulation passage 500 is composed of a series of distribution passages that connect suction passages 54, blowing passages 55, a top wall side passage 50, battery passages 56, and gathering passages 53.

The blowing passages 55 constitute fluid discharge passages where the fluid discharged by the blowers 4A, 4B flows.

The suction passages 54, the gathering passage 53, and the blowing passages 55 constitute fluid suction passages where the fluid discharged from the blowing passages 55 circulates after heat-exchanging with the plurality of battery cells 3 and being cooled.

The case 202 has a box-shape with a plurality of walls that surround the internal space, and is formed with an aluminum plate or a steel plate.

The case 202 is a case having six walls (for example, the side walls 22, 21, 20, 24, the top wall 25, and the bottom wall 23), for example.

The plurality of battery cells 3 constitutes a plurality of cell stacks in the internal space of the case 202.

The plurality of battery cells 3 that constitute the plurality of cell stacks are disposed with a predetermined interval therebetween, and the battery passage 56 where the fluid can flow through is formed between the adjoining battery cells 3.

The battery passage 56 is formed by a spacer component (not shown) disposed between the cells.

A passage where the fluid flows in the vertical direction is formed by the spacer component being sandwiched and supported between the cells.

That is, the side wall 22 side and side wall 21 side of each battery passage 56 is closed, the top wall 25 side of each battery passage 56 opens wide towards the top wall side passage 50, and the bottom wall 23 side of each battery passage 56 is connected to a gathering duct 63 between cells, and each battery passage 56 is lead to the gathering passages 53.

Thereby, each battery passage 56 has an entrance part for the fluid in the top wall 25 side, and has an exit part for the fluid that gathers in the gathering passage 53 in the bottom wall 23 side.

The gathering duct 63 is a duct that connects a downstream side end (bottom end) of each battery cell 3 and the suction passages 54 in a suction duct 62.

The gathering duct 63 forms the gathering passage 53 where the fluid flows out from each battery passage 56 can connect thermally to the bottom wall 23.

In other words, the heat of the fluid circulating in the gathering passage 53 can move to the bottom wall 23.

The gathering passage 53 is a passage that extends from the exit part of each battery passage 56 to the suction passages 54 parallel with the bottom wall 23, and communicates with the respective suction part 43 of the blower 4A and the blower 4B through the suction duct 62 and a duct connecting member 60.

The top wall side passage 50 is a passage that extends parallel with the top wall 25 and is formed between the top wall 25 and the plurality of battery cells 3.

The side wall side passage 51 is a passage that extends parallel with the side wall 22 that intersects perpendicularly with both the top wall 25 and the bottom wall 23, and is formed between the plurality of battery cells 3 and the side wall 22.

The side wall side passage 52 is a passage that intersects perpendicularly with both the top wall 25 and the bottom wall 23, extends parallel with the side wall 21 facing the side wall 22, and is formed between the plurality of battery cells 3 and the side wall 21.

As the fluid that circulates in the circulation passage 500, air, various kinds of gas, water, and other coolant can be used, for example.

The casing 42 forms the suction part 43 that is lead to the inlet of the sirocco fan 40 inside.

The suction part 43 and the suction passages 54 in the suction duct 62 are communicated by being connected by the duct connecting member 60.

The duct connecting member 60 is an attachment that connects the casing 42 and the suction duct 62.

Since the duct connecting member 60 has a rectangular parallelepiped chamber inside, it contributes also to reducing circulation resistance of the circulation fluid.

The rotating shaft of the fan of each blower 4A, 4B is disposed in the direction along the top wall 25 or the bottom wall 23. Each blower 4A, 4B is disposed so as to suck the fluid in the axial direction, while discharges the fluid in the centrifugal direction.

Each blower 4A, 4B is disposed facing the motor 41 side of the side wall 20 of the case 202, i.e., a back side (motor 41 side) opposite to the suction part 43.

A blowing duct 61 that forms the blowing passages 55 that is one of the circulation passages 500 is connected to the discharge part of the casing 42.

The blowing passages 55 of the blower 4A extends in the fan's centrifugal direction near the bottom wall 23 and the side wall 22 so as to extend along both of these walls.

The blowing passage 55 of the blower 4A is connected to the second wall passage formed by the passage forming member 209.

Therefore, the fluid that blown from the blower 4A through the blowing passage 55 flows towards the side wall 24 in the side wall side passage 51 that is the second wall passage so as to flow along the side wall 22, and further flows towards a central part of the top wall side passage 50 through the side wall side passage 51.

Then, by the fluid sucking force of the blower 4A, the fluid flows into each battery passage 56 and flows downwardly, and flows into the gathering passage 53 from the bottom end of each battery passage 56, and then the fluid returns to the blower 4A through the suction passages 54 and the suction part 43.

The blowing passages 55 of the blower 4B extends in the fan's centrifugal direction near the bottom wall 23 and the side wall 22 so as to extend along the both walls.

The blowing passage 55 of the blower 4B is connected to the first wall passage formed by the passage forming member 209.

Therefore, the fluid that blown from the blower 4B through the blowing passage 55 flows towards the side wall 24 in the side wall side passage 52 that is the first wall passage so as to flow along the side wall 21, and further flows towards a central part of the top wall side passage 50 through the side wall side passage 52.

Then, by the fluid sucking force of the blower 4B, the fluid flows into each battery passage 56 and flows downwardly, and flows into the gathering passage 53 from the bottom end of each battery passage 56, and then the fluid returns to the blower 4B through the suction passages 54 and the suction part 43.

Moreover, when flowing through each battery passage 56, the fluid that flows through the circulation passage 500 absorbs heat from each battery cell 3, or heats each battery cell 3.

The fluid that cooled or heated each battery cell 3 is gathered in the gathering passage 53, and is sucked by each of the blowers 4A, 4B through the suction passages 54 and the suction part 43.

Moreover, since the fluid also contacts with the electrode terminals of the battery cell 3 which are either the anode terminal and the cathode terminal, or the bus bar that electrically connects between different pole terminals during circulating through the inside of the case 202, the electrode terminal and the bus bar can also constitute one of the heat transfer means.

The battery monitoring unit varies the rotational speed of each fan by applying the voltage controlled to the duty ratio of any value included in 0%-100% relative to the maximum voltage to each motor 41 of the blowers 4A, 4B.

The speed of cooling air according to each blower 4A, 4B may be adjusted continuously or step by step by changing the rotational speed of the fan by this duty control in the battery cooling system 201.

The passage forming member 209 forms the wall passage disposed along the walls of the case 202 between at least a single wall among the plurality of walls that forms the case 202.

The passage forming member 209 forms the side wall side passage 52 that is the first wall passage, and the side wall side passage 51 that is the second wall passage.

The passage forming member 209 is a member formed integrally with the side walls 21, 22 in the case 202.

The passage forming member 209 is composed of a duct-shaped member that has six faces.

The passage forming member 209 has a ceiling wall part 130 that has a trapezoid-like planar-view when seen from the top wall 25 side.

Furthermore, the passage forming member 209 has a bottom wall part that faces the ceiling wall part 130, and wall parts 100, 110, 120 intersect perpendicularly with the ceiling wall part 130 and the bottom wall part.

The wall part 100 is a wall part disposed on an upstream side end of the passage forming member 209 so as to intersect with the side wall 21 or the side wall 22.

The wall part 120 is a wall part disposed on a downstream side end of the passage forming member 209 so as to intersect with the side wall 21 or the side wall 22.

The wall part 110 is a wall part disposed parallel to the side wall 21 or the side wall 22, and connects the wall part 100 and the wall part 120.

A plurality of inflow openings 10 is formed in the wall part 100. The fluid flowing out of the blower 4A or the blower 4B and before contacting the battery cell 3 passes through the inflow openings 10 when flowing into the wall passage.

The plurality of inflow openings 10 are arranged in a line in a direction from the bottom wall 23 to the top wall 25.

Each inflow opening 10 is an opening having a slit-shape that is thin and long in a direction parallel to the top wall 25 or the bottom wall 23.

The plurality of outflow openings 11 are formed in the wall part 110. The fluid that flows in from the inflow openings 10 and flows through the wall passage passes through the outflow openings 11 when flowing out of the wall passage.

The plurality of outflow openings 11 is positioned so as to align at a predetermined interval in a longitudinal direction, i.e., a stacking direction of the battery cells 3.

Each outflow opening 11 is an opening having a slit-shape that is thin and long in a direction parallel to the side wall 21 or the side wall 22.

The fluid that flows out of the wall passage by passing the plurality of outflow openings 11 flows inside of the case 202 toward the central part, and flows into each battery passage 56.

Thus, the passage forming member 209 forms a wall passage in the inside of a duct-shaped body by constituting that the duct-shaped member has a longitudinal shape in a direction from the side wall 20 to the side wall 24, and has the inflow parts and the outflow parts.

A passage forming member 309 shown in FIG. 11 is another form of the passage forming member 209.

The passage forming member 309 is constituted by a duct-shaped member that has openings in the wall parts of both ends in the longitudinal direction.

A plurality of outflow openings 12 that are the same form and the direction as the inflow opening 10 formed in the wall part 100 are formed in the wall part 120.

The outflow opening 12 constitutes the outflow part where the fluid that flows in from the inflow part and flows through the wall passage passes when flowing out of the wall passage.

The fluid that flows out of the wall passage by passing the plurality of outflow openings 11 and the plurality of outflow openings 12 flows inside of the case 202 toward the central part, and flows into each battery passage 56.

The battery cooling system 201 has a fluid introduction passage that introduces the fluid outside of the case 202 into inside the case 202 sucked by the sucking force of the blowers 4A, 4B.

The battery cooling system 201 has a fluid discharge passage that is a passage that penetrates the wall that forms the case 202, and discharges a part of the fluid discharged from the blowers 4A, 4B to outside the case 202.

The fluid passages along which the fluid sucked by the blowers 4A, 4B passes are the fluid suction passages (the suction passages 54 and the gathering passage 53) and the fluid introduction passage (an introduction passage 58).

The introduction passage 58 is a passage that communicates the outside the case 202 and each blower.

For example, the introduction passage 58 is a passage whose passage cross sectional area is smaller than that of the suction passage 54 and the gathering passage 53.

The introduction passage 58 is an internal passage of an air supplying duct 64 connected to the duct connecting member 60.

In the outside of the case 202, an air supply inlet of the air supplying duct 64 opens.

The air supplying duct 64 connects the upper part of the duct connecting member 60 and outside of the case 202 by penetrating the top wall 25 of the case 202.

The fluid sucked into the air supplying duct 64 by the sucking force of the blowers 4A, 4B is taken into the inside of the case 202. The fluid is introduced into each suction part 43 of the blowers 4A, 4B through the introduction passage 58, and is blown from the blowing passages 55 to flow through the circulation passage 500.

The battery cooling system 201 has a discharge passage 57 where a part of fluid circulating within the case 202 leaks outside.

The discharge passage 57 is a passage that communicates with the inside and outside of the case 202.

The fluid discharge passage (the discharge passage 57) is a passage disposed in the wall of the case 202 where the fluid discharged from the fluid discharge passage (blowing passages 55) contacts before reaching the fluid suction passages (the suction passages 54, the gathering passage 53).

The pressure of the circulating fluid is reduced by pressure loss when circulating in the battery passages 56.

For this reason, before high-pressure discharged fluid is decompressed after heat-exchanging with the battery cell 3, the high-pressure fluid is discharged from the discharge passage 57 that penetrates the wall of the case 202.

The battery cooling system 201 of the fourth embodiment has the discharge passage 57 that is a passage that penetrates the side wall 24.

Figure 14:
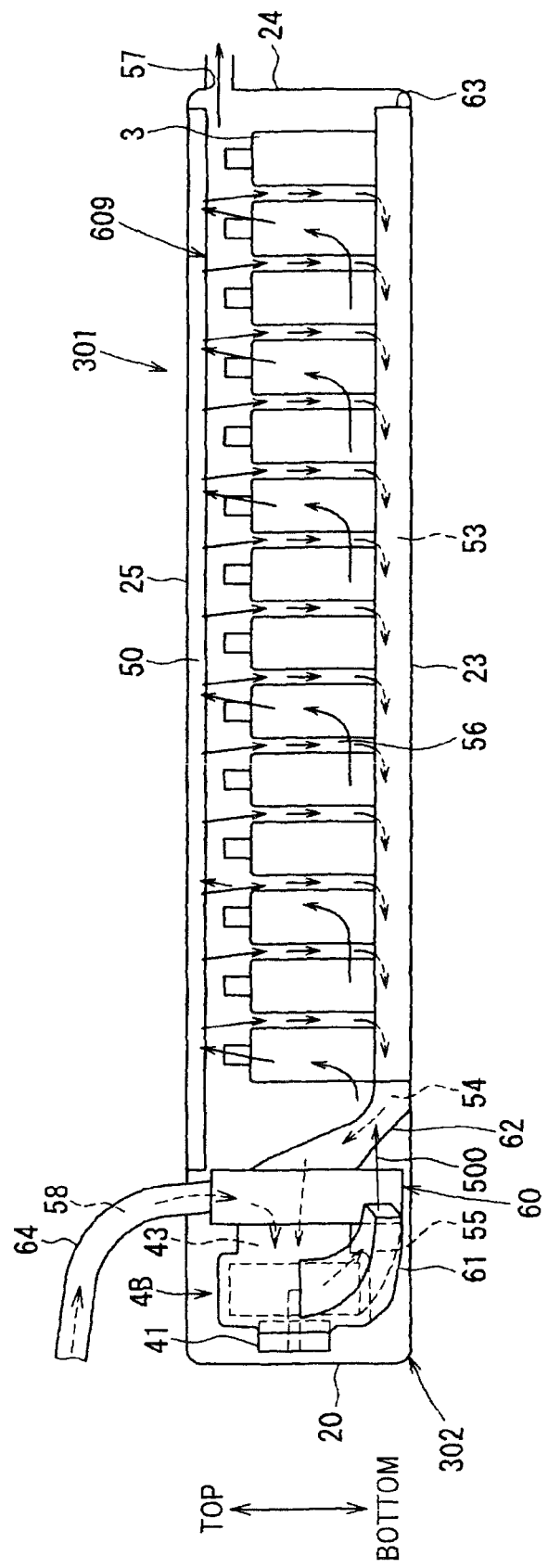
FIG. 14 shows a schematic diagram for explaining a composition of a system and a flow of fluid for cooling a battery of a battery cooling system in a sixth embodiment.

Moreover, as shown in FIG. 14 that explains a sixth embodiment described below, the discharge passage 57 is disposed in the side wall 24 in a position higher than the exterior case of the battery cell 3, i.e., a position near the top wall 25.

As shown in FIG. 9, it is desirable that the discharge passage 57 is disposed in the side wall 24 so that it is positioned in the middle of the blowing passages 55 of each blower 4A, 4B and is aligned in a direction where the blowers 4A, 4B are aligned.

According to this composition, it becomes possible to discharge fluid from the discharge passage 57 with a well-balanced flow rate without inclining the flow discharge from the two blowers 4A, 4B toward one side.

Thus the discharge passage 57 is a passage that penetrates the wall (side wall 24) disposed so that the plurality of battery cells 3 is located between the blowing passages 55 among the walls that form the case 202.

In order to emit the heat inside the case 202 to outside efficiently, the battery cooling system 201 realizes a formation of the fluid circulation within the case 202, and a reservation of an amount of external fluid introduced into the case 202.

The amount of external fluid introduced can be improved by raising the pressure difference between the discharge passage 57 and the introduction passage 58.

For this reason, in order to secure the amount of the external fluid introduced through the introduction passage 58, the discharge passage 57 is disposed in a position where the fluid pressure becomes higher than that of the suction passages 54 or the gathering passage 53 in the battery cooling system 201.

The position where the fluid pressure is higher than that of the suction passages 54 or the gathering passage 53 means that the discharge passage 57 is disposed in the wall of the case 202 where the fluid discharged from the discharge passage (blowing passages 55) contacts before flowing into the battery passage 56.

The position of the high fluid pressure corresponds to arbitrary positions in the top wall 25, the side wall 22, the side wall 21, and the side wall 24 of the case 202 where the fluid discharged from the blowing passages 55 contacts before heat-exchanging with the battery cells 3.

The battery cooling system 201 is disposed so that the introduction passage 58 is communicated with a compartment of the vehicle.

The air supplying duct 64 is extended so that the fluid inflow part is positioned in the compartment of the vehicle.

The air supplying duct 64 may be disposed so as to penetrate an interior member of the compartment in order to communicate with the compartment of the vehicle, or may be disposed so that is crawl a side part of the compartment, for example.

Therefore, the fluid that the blowers 4A, 4B suck through the introduction passage 58 is air in the compartment.

An air-conditioner that conditions air in the compartment of the vehicle may be installed in the vehicle.

Therefore, the introduction passage 58 is a passage that introduces atmospheric air or air (internal air) of the compartment that is cooler than the ambient air temperature of the case 202 into the case 202.

According to the battery cooling system 201, since the air-conditioned air of the compartment can be introduced into the case 202 through the fluid introduction passage, a difference in temperature with the air discharged from the fluid discharge passage can be increased.

Therefore, since the amount of external heat released to outside can be increased by the difference in temperature becoming large in this way, the cooling capability of the battery cooling system 201 can further be improved.

Moreover, the fluid contacts the side wall 22, the side wall 21, the top wall 25, and bottom wall 23 in the process of circulating through the circulation passage 500.

When the circulation fluid flows through the side wall side passages 51 and 52, it releases heat to outside of the case 202 through the side wall 22 and the side wall 21 before heat exchanging with the battery cells 3.

Moreover, when the circulation fluid flows through the top wall side passage 50, it releases heat to outside of the case 202 through the top wall 25 just before heat exchanging with the battery cells 3.

The heat emitted through the side wall 22, the side wall 21, and the top wall 25 are released to outside of the case 202 by natural convection.

Therefore, a whole top wall 25 and the whole side walls 22, 21 function as heat releasing surfaces when emitting the heat of the battery cells 3 within the case 202 to outside.

Next, functions and effects that the battery cooling system 201 of the fourth embodiment brings are explained.

The passage forming member 209 is formed integrally with the side wall 21, 22 that is one of the walls that forms the case 202 so as to cover sides of the plurality of battery cells 3.

Since the passage forming member 209 constitutes the wall passage inside by forming the hollow-structured duct-shaped member integrated with the side wall 21 or the side wall 22, the walls of the case 202 can be reinforced, while the surface area of heat released through the walls of the case 202 can be increased.

Since the passage forming member 209 is widely and continuously formed in the direction of long sides of the side wall 21 or the side wall 22, a rigidity of the case 202 can be raised very greatly.

According to the effect of this improved rigidity, the capability to protect the group battery from the collision of vehicles can be heightened when the battery cooling system 201 is installed in the vehicle, for example.

Moreover, according to the passage forming member 209, the flow that makes cooling fluid reliably flows along the side wall side passage 51 or the side wall side passage 52 can be formed.

Therefore, since the area that cooling fluid contacts is expandable, the passage forming member 209 can function as a heat transfer fin.

[The Fifth Embodiment]

Figure 12:
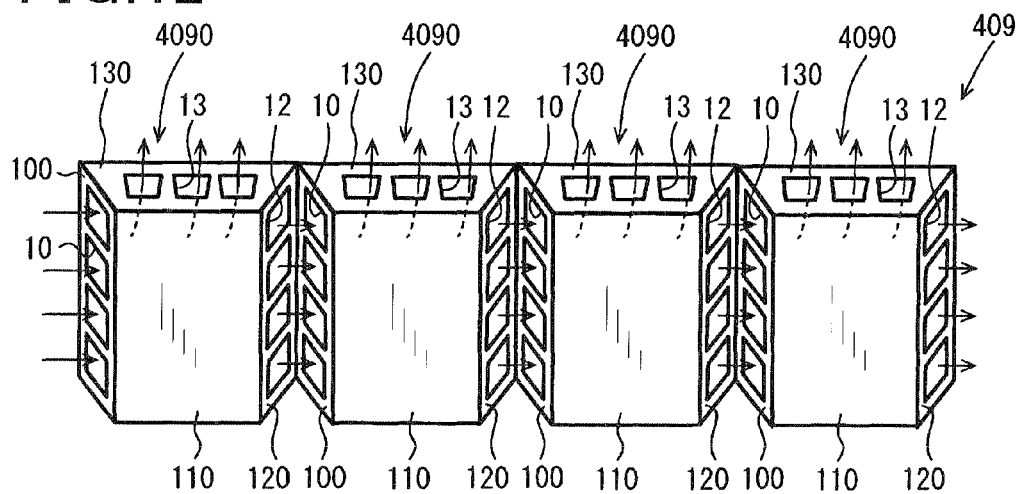
FIG. 12 shows a figure of the wall passage forming member and the flow of the fluid in a fifth embodiment.
Figure 13:
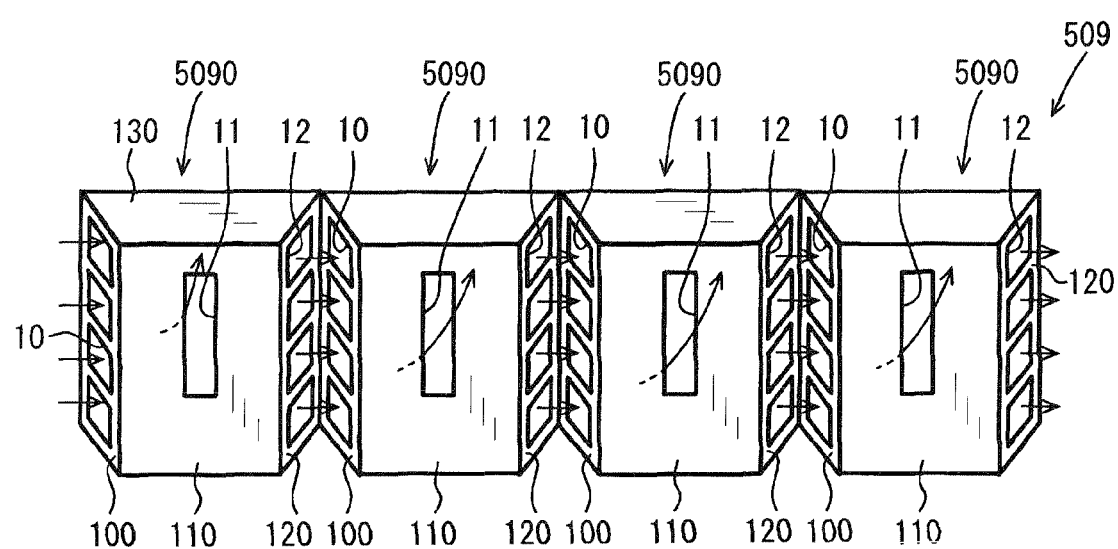
FIG. 13 shows a figure of the wall passage forming member and the flow of the fluid of another example in the fifth embodiment.

The fifth embodiment explains passage forming members 409 and 509, which have different forms with the fourth embodiment, with reference to FIG. 12 and FIG. 13.

In FIG. 12 and FIG. 13, components having the same composition as the first embodiment are given the same reference numerals, and have the same functions and effects.

In addition, compositions, functions, and effects that are not explained in particular in the fifth embodiment are the same as those of the previous embodiments.

Hereinafter, only different points from the previous embodiments are explained.

The passage forming member 409 is composed of a plurality of unit components 4090 aligned in a direction that goes from the side wall 20 to the side wall 24 as shown in FIG. 12.

Each unit component 4090 has a shape as the passage forming member 309 having the longitudinal shape shown in the fourth embodiment shortened in the longitudinal direction.

Therefore, each unit component 4090 constitutes a part of the side wall side passage 52 or a part of the side wall side passage 51, and the plurality of unit components 4090 that constitute the passage forming member 409 occupy most of the side wall side passage 51 or the side wall side passage 52.

The unit component 4090 is composed of a duct-shaped member that has walls forming six faces as the passage forming member 209.

A plurality of outflow openings 13 is formed in a ceiling wall part 130. The fluid that flows in from the inflow opening 10 and circulates the inside of the unit component 4090 passes through the outflow openings 13 when flowing out from the wall passage.

The plurality of outflow openings 11 is positioned so as to align at a predetermined interval in the stacking direction of the battery cells 3.

The fluid that flows out of the blowing passage 55 flows into the inside of the unit component 4090 from a plurality of inflow openings 10, flows through a wall passage, and a part of the fluid flows out of the plurality of outflow openings 13 upwardly.

The fluid that passed the plurality of outflow openings 13 flows through the inside of the case 202 toward the central part, and flows into each battery passage 56.

Moreover, the remainder of fluid that flows through the wall passage in the unit component 4090 flows out of a plurality of outflow openings 12, and flows into the inside of the unit component 4090 from the plurality of inflow openings 10 of the adjoining unit component 4090.

Furthermore, in the adjoining unit component 4090, similarly, a part of the fluid flows out of the plurality of outflow openings 13 upwardly, and the remainder flows out of the plurality of outflow openings 12, and flows into the inside of the unit component 4090 from the plurality of inflow openings 10 of the adjoining unit component 4090.

By repeating this, the fluid forms a flow that continues circulating the wall passage toward the side wall 24, and a flow that flows through the inside of the case 202 toward the central part on the way.

The passage forming member 509 shown in FIG. 13 is another form of the passage forming member 409.

Each unit component 5090 has an outflow opening 11 in a wall part 110.

Therefore, the plurality of outflow openings 12 and the outflow opening correspond to the outflow parts of the fluid in each unit component 5090.

[The Sixth Embodiment]

Figure 15:
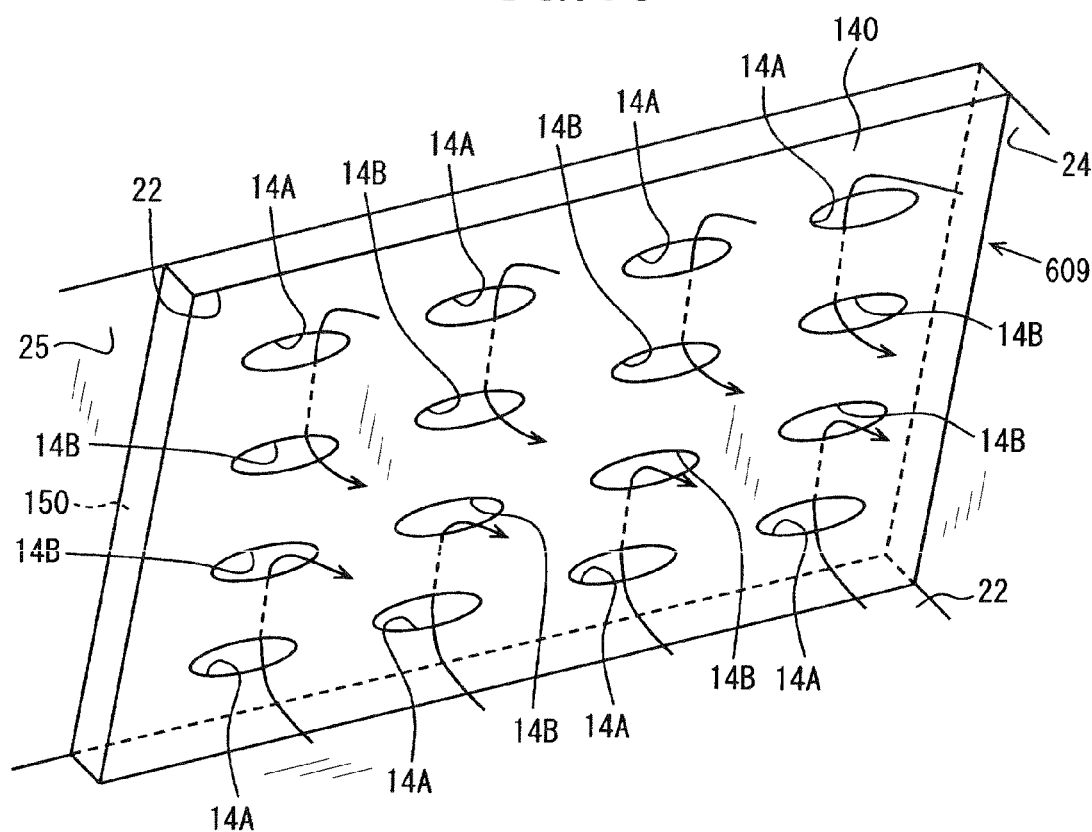
FIG. 15 shows a perspective view of a wall passage forming member in the sixth embodiment.

The sixth embodiment explains a battery cooling system 301, which has a different form from the previous embodiments, with reference to FIG. 14 and FIG. 15.

In FIG. 14 and FIG. 15, components having the same composition as the fourth embodiment are given the same reference numerals, and have the same functions and effects.

In addition, compositions, functions, and effects that are not explained in particular in the sixth embodiment are the same as those of the previous embodiments.

Hereinafter, only different points from the previous embodiments are explained.

The battery cooling system 301 has a passage forming member 609 that forms the top wall side passage 50 the second wall passage.

The passage forming member 609 is a component formed in the top wall 25 integrally in the case 302.

The passage forming member 609 is composed of a duct-shaped member that is consisted of a flat rectangular parallelepiped.

The passage forming member 609 has a wall part 140 disposed parallel with the top wall 25.

The passage forming member 609 is formed so as to cover a whole upper part of the group battery in the top wall 25.

Furthermore, the passage forming member 209 has a side wall that is disposed intersecting perpendicularly with both the wall part 140 and the top wall 25, and connects these, and forms the flat rectangular parallelepiped second wall passage 150 between the wall part 140 and the top wall 25.

A plurality of inflow openings 14A are formed in the wall part 140. The fluid flowing out of the blower 4A or the blower 4B and before contacting the battery cell 3 passes through the inflow openings 14A when flowing into the second wall passage 150.

In each of the side wall 21 side and side wall 22 side, the plurality of inflow openings 14A are disposed in a line in a direction from the side wall 20 to the side wall 24.

Furthermore, a plurality of outflow openings 14B is formed in the wall part 140. The fluid that flows in from each inflow opening 14A and circulates the inside of the second wall passage 150 passes through the outflow openings 14B when flowing out from the wall passage.

In each of the side wall 21 and side wall 22 side, two rows of the plurality of outflow openings 14B are disposed in a line in the direction from the side wall 20 to the side wall 24 and inner side of the plurality of inflow openings 14A.

The fluid that flows out of the second wall passage 150 by passing the plurality of outflow openings 14B flows downwards inside of the case 202, and flows into each battery passage 56.

Thus, since the passage forming member 609 is constituted by the duct-shaped member that has the inflow parts and the outflow parts disposed so as to cover the group battery, the wall passage is formed inside of its duct-shaped body.

According to the passage forming member 609 of the sixth embodiment, since the passage forming member 609 constitutes the wall passage inside by forming the hollow-structured duct-shaped member integrated with the top wall 25, the walls of the case 302 can be reinforced, while the surface area of heat releasing through the top wall 25 can be increased.

Since the passage forming member 509 is widely and continuously formed in the direction of long sides of the top wall 25, a rigidity of the case 302 can be raised very greatly.

According to the effect of this improved rigidity, the capability to protect the group battery from the collision of vehicles can be heightened when the battery cooling system 301 is installed in the vehicle, for example.

Moreover, according to the passage forming member 609, a flow that makes cooling fluid reliably flow along the top wall side passage 50 can be formed.

Therefore, since the area that the cooling fluid contacts is expandable, the passage forming member 609 can be used as a heat transfer fin.

[Other Embodiments]

Although the preferred embodiments of the present disclosure are described in the embodiments described above, the present disclosure is not limited to the embodiments described above, and may be implemented in various modifications without departing from scopes of the present disclosure.

The structures of the embodiments described above are simply examples, and the scopes of the present disclosure are not intended to be limited to the scopes of the description.

The scopes of the present disclosure are indicated by appended claims, and are intended to include any modifications within the scopes and meanings equivalent to the description of the scopes of the claims.

The outflow parts of the passage forming members 9, 109 are explained as the exit parts where the fluid that flows through the wall passage flows out toward the battery cells 3 or the walls of the cases 2, 102 in the above-mentioned embodiment.

These outflow parts are not limited such that fluid only flows out of the wall passage.

The outflow part may become a part where the fluid flows in depending on a position and the circulating flow rate of the fluid, for example.

Besides the sirocco fan, an axial fan, a turbofan, a cross flow fan, etc. can be used for the fan of the fluid driving unit in the above-mentioned embodiment.

In the case of the above-mentioned embodiment, although the wall of the case having the largest surface area is equivalent to the bottom wall or the top wall of the case, the wall may not be limited to these walls, but may be the side wall or other walls.

The first heat-release accelerating portions 230 and the second heat-release accelerating portions 210, 220 in the above-mentioned embodiment are not limited to the shape of the fin as shown in the drawings.

As long as each heat-release accelerating portions 230, 210, 220 has the composition that can emit the heat transmitted from the fluid that passes inside the wall in large quantities than from outer surfaces of the wall, various shapes can be applied.

Each heat-release accelerating portions may optionally not be a fin, but may be a heat exchanging system of contacting a fluid having a lower temperature than an internal air on outer surface of a wall indirectly or directly, for example.

Fins that expand heat releasing areas as a heat releaser of the battery cell 3 may be provided to the bus bar 300 in the above-mentioned embodiment.

This fin can be formed by forging or cut and bending a copper material etc. that constitutes the bus bar 300.

Moreover, a separate fin may be attached, by welding for example, to the bus bar 300.

Each projecting portion that forms the fluid flow guiding unit 7, 8 is a projecting portion projected from the side wall of the case 102 in the above-mentioned embodiment.

Each projecting portion that forms the fluid flow guiding unit of the present disclosure includes projecting portions projected from the top wall and the bottom wall of the case 102.

That is, each projecting portion includes projecting portions that project downwardly or upwardly.

As other forms of the battery cooling system in which the present disclosure is included, a system that has both a passage forming member of the fourth embodiment or a passage forming member of the fifth embodiment, and a passage forming member of the sixth embodiment is also applicable.

Moreover, as other forms of the battery cooling system in which the present disclosure is included, a system that combines the passage forming member of the fourth-sixth embodiments and the fluid driving unit of the first embodiment is also applicable.

What is claimed is:

1. A battery cooling system comprising:
a plurality of batteries electrically connected mutually;
a case that forms an internal space surrounded by a plurality of walls to accommodate the plurality of batteries;
a driving fluid unit accommodated in the case that circulates a fluid for cooling the plurality of batteries inside of the case; and
a passage-along-wall forming member that forms a passage-along-wall disposed along with and between at least a single wall among the plurality of walls that forms the case and the passage-along-wall forming member; wherein
the passage-along-wall forming member has an inflow part where the fluid flowing out of the driving fluid unit before contacting the batteries passes when flowing into the passage-along -wall, and an outflow part where the fluid flowing in from the inflow part into the passage-along-wall passes when flowing out from the passage-along-wall; and
the passage-along-wall includes passages disposed along with the walls of the case that face each other with the plurality of batteries disposed therebetween.

2. The battery cooling system according to claim 1,
the outflow part includes an outflow part for communication that faces an adjoining wall so that the fluid flowing through the passage-along-wall flows out from the passage-along-wall and further flows along with the adjoining wall.

3. The battery cooling system according to claim 1,
the passage-along-wall forming member has a plurality of outflow parts;
the plurality of outflow parts is disposed in a flowing direction of the fluid that flows through the passage-along-wall with intervals therebetween; and the fluid that flows out from the outflow parts flows towards the batteries.

4. The battery cooling system according to claim 1,
the passage-along-wall forming member is constituted by an inner wall disposed away from at least the single wall with an interval therebetween so as to face the single wall of the case.

5. The battery cooling system according to claim 4,
the outflow part is an opening formed in the inner wall.

6. The battery cooling system according to claim 1,
the passage-along-wall forming member is formed integrally with at least a single wall, and is constituted by a duct-shaped member with both ends having openings that constitute the inflow part and the outflow part.

7. The battery cooling system according to claim 6,
the duct-shaped member is formed integrally with a top wall that is one of the walls to form the case so that upper parts of the plurality of batteries are covered.

8. The battery cooling system according to claim 6,
the duct-shaped member is formed integrally with a side wall that is one of the walls to form the case so that sides of the plurality of batteries are covered.

9. The battery cooling system according to claim 1, wherein,
there is further provided passages disposed along with the wall that adjoins both the walls of the case that face each other with the plurality of batteries disposed therebetween.

10. The battery cooling system according to claim 1,
a guiding fluid flow unit is disposed in the passage that guides the fluid that flows out from the driving fluid unit and before contacting the batteries in a direction away from the batteries; and
the guiding fluid flow unit is projecting from the walls of the case, and is constituted by a projecting portion extending in the direction away from the batteries and in a direction parallel to the wall.

* * * * *